United States Patent
Smith

[15] 3,662,251
[45] May 9, 1972

[54] METHOD AND SYSTEM FOR MEASURING ACCELERATION AND VELOCITY

[72] Inventor: Otto Joseph Mitchell Smith, 612 Euclid Avenue, Berkeley, Calif. 94708

[22] Filed: June 22, 1970

[21] Appl. No.: 48,130

[52] U.S. Cl. ................................ 322/23, 322/24, 322/25, 322/31, 322/32, 322/59, 324/162, 324/177

[51] Int. Cl. .......................................................... H02p 9/38

[58] Field of Search .................. 322/20, 23, 24, 25, 27, 28, 322/29, 31, 32, 59; 324/161, 162, 177

[56] References Cited

UNITED STATES PATENTS 3,474,323  10/1969  Kilgore et al. ...................... 322/28 X
3,110,817  11/1963  Frederick ............................ 322/24 X Primary Examiner—Lewis H. Myers
Assistant Examiner—H. Huberfeld
Attorney—Flehr, Hohbach, Test, Albritton & Herbert

[57] ABSTRACT

The acceleration of the shaft of a synchronous alternator is measured accurately with low noise by computing the power going into acceleration, which is the input shaft power plus the excitation power less the measured generator output less the computed losses. The accelerating power is divided by the speed to determine the accelerating torque. The accelerating torque is divided by the moment of inertia of the alternator to determine the acceleration. The integral of the acceleration is the shaft angular velocity so that both acceleration and velocity signals are simultaneously available in accordance with this invention.

47 Claims, 12 Drawing Figures

INVENTOR
OTTO J.M. SMITH

FIG_10

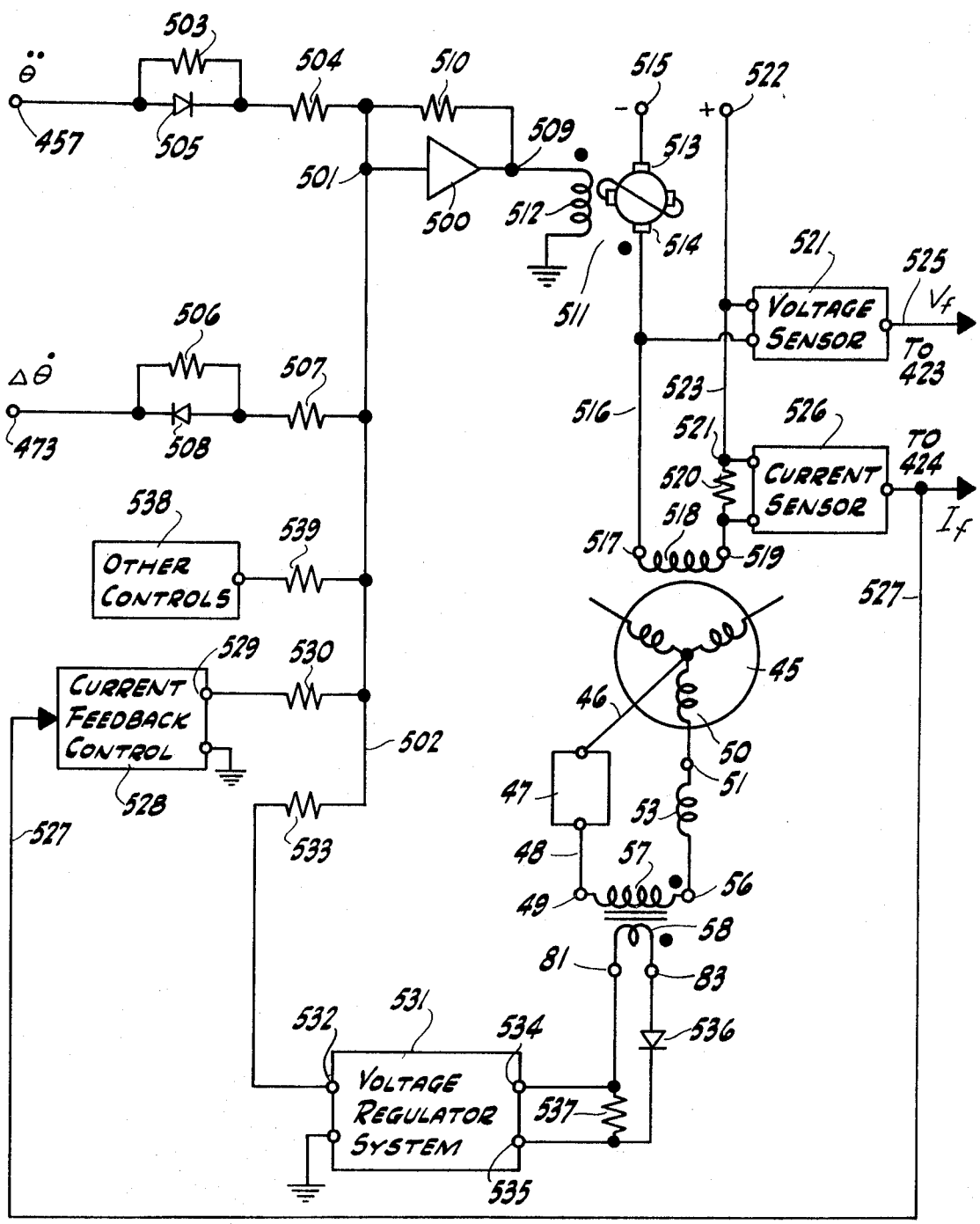
FIG_12

3,662,251

METHOD AND SYSTEM FOR MEASURING ACCELERATION AND VELOCITY

FIELD OF THE INVENTION

This invention relates to an accelerometer and tachometer and more specifically relates to a low noise alternator analog accelerometer and tachometer.

DESCRIPTION OF THE PRIOR ART

Conventional accelerometers and tachometers fall generally into two classes. The first type is an electrical accelerometer or tachometer in which a generator or alternatively a commutator switching arrangement is associated with a shaft. In response to rotation or acceleration of the shaft an electrical signal is generated or modified in the case of the commutator which is proportional to the speed or acceleration of the shaft. These conventional electrical tachometers or accelerometers have the shortcoming that their outputs are noisy because of the presence of commutation and/or rectification ripple, making precise acceleration and velocity measurements very difficult. The second general type of tachometers or accelerometers can be generally described as mechanical. Various forms of mechanical devices are available in the prior art but, as the name implies, all of these devices require mechanical connection to the shaft. This subjects the devices to vibration and torsional oscillations which are also detrimental to precise measurements.

SUMMARY OF THE INVENTION

Accordingly, it is an object of this invention to provide an alternator analog accelerometer and tachometer for accurately measuring with low noise the acceleration and velocity of the shaft of a synchronous alternator.

It is another object of this invention to provide means for measuring the electrical power flow out of an alternator, means for determining power loss within the alternator, means for generating a signal proportional to the sum of the electrical power output and the loss, and means responsive to the signal to produce an output proportional to the change in velocity of the shaft of the alternator.

It is another object of this invention to provide apparatus for deriving the angular velocity of a shaft from a signal proportional to the acceleration of the shaft.

It is a further object of this invention to provide means for measuring the voltage at the terminals of an alternator, means for computing a current loss signal responsive to the voltage, means for measuring the current at the terminals of an alternator, means for computing a voltage loss signal responsive to the current, means for adding the voltage loss signal and the voltage signal to produce a sum voltage signal, means for adding the current signal and the current loss signal to produce a sum current signal, means for multiplying the sum voltage signal and the sum current signal to compute a power signal, further means responsive to the power signal to produce an approximate velocity change signal, means responsive to the power signal and the approximate velocity change signal for computing an acceleration signal, and second filter means responsive to the acceleration signal to produce a velocity signal.

It is a still further object of this invention to provide means for measuring the voltage at the terminals of an alternator, means for measuring the current in one conductor from an alternator, means for conducting a secondary current, proportional to the current through the one conductor through a reactance proportional to the synchronous quadrature-axis reactance of the alternator, means for connecting the reactance in series with a transformer secondary winding containing a voltage proportional to the measured voltage at the alternator terminals, means for generating a signal voltage proportional to the sum of the secondary winding voltage and the voltage drop through the reactance, and means for measuring the frequency of the signal voltage.

Briefly, according to one embodiment of the invention, there is provided an apparatus and method for generating signals proportional to shaft acceleration, shaft velocity and changes in shaft velocity of an alternator by computations dependent upon measurements responsive to the terminal voltage and terminal current of the alternator. These shaft acceleration and velocity signals are obtained from the conventional excitation and armature windings of the alternator without connection to the shaft of any other device.

BRIEF DESCRIPTION OF THE DRAWINGS

Other objects and advantages of the present invention will become apparent from the following detail description of a preferred embodiment thereof when considered in conjunction with the accompanying drawings wherein:

FIG. 12 shows the use of acceleration and velocity signals in supplementary excitation controls.

DESCRIPTION OF THE PREFERRED EMBODIMENT

Figure 1:
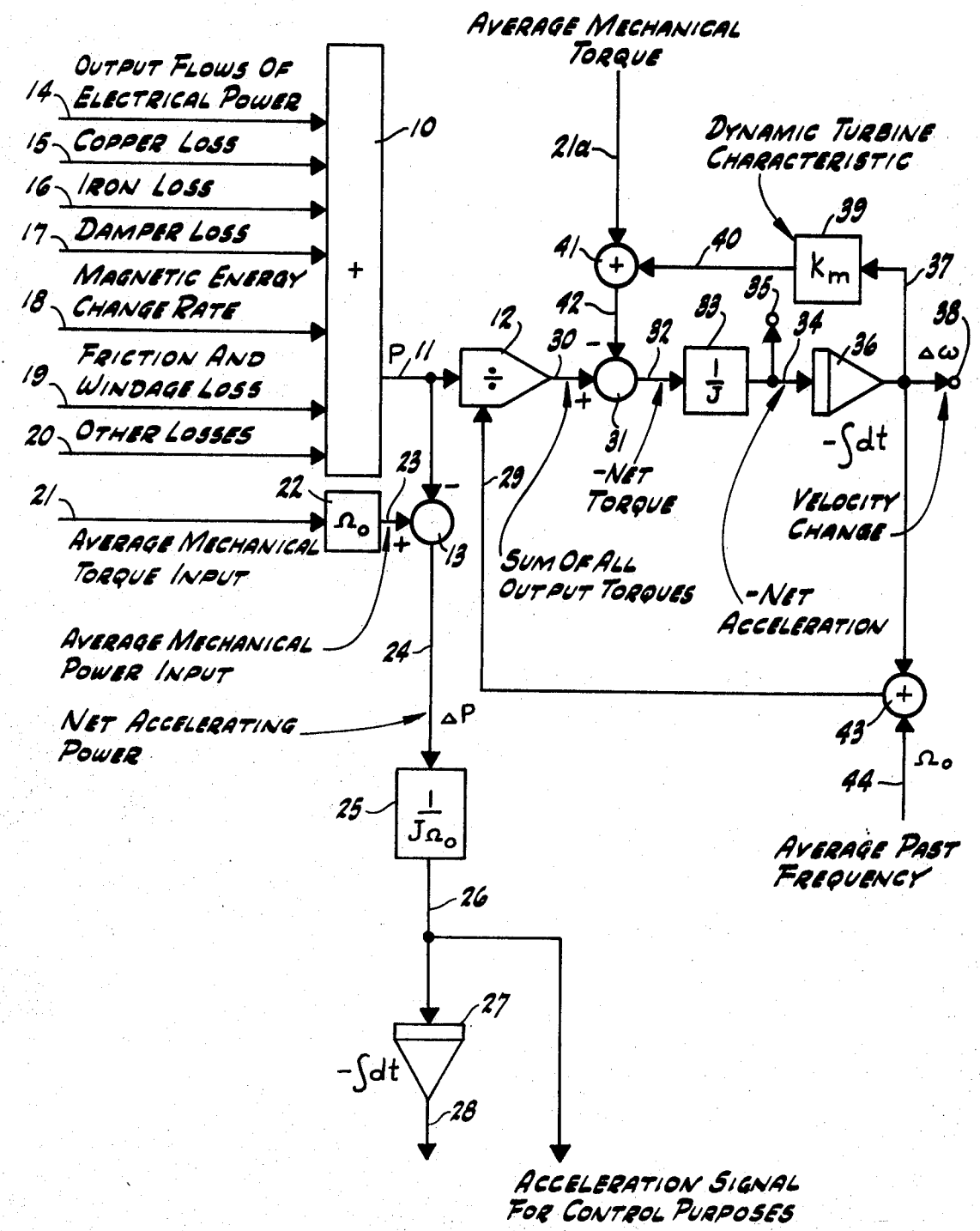
FIG. 1 is a block diagram of an accelerometer and tachometer constructed in accordance with the principles of this invention.

FIG. 1 is a block diagram of the accelerometer and tachometer. In FIG. 1 a summer, 10, receives a variety of measured and computed inputs and delivers a signal in units of power marked P on conductor 11 which is the positive numerator input to operational divider 12 and the negative input to subtractor 13. The inputs to summer 10 are: conducter 14, with a signal equal to the electrical power flow out of the alternator less the power flow into the field winding of the alternator; conductor 15, which has a signal equal to the sum of the copper losses within the windings of the alternator; conductor 16, which has a signal which is equal to the iron losses in the alternator; conductor 17 which has a signal equal to the losses in the amortisser winding; conductor 18, which has a signal equal to the time rate of increase of magnetic energy stored in the leakage reactance of the armature, the leakage reactance of the field and the main mutual flux of the alternator; conductor 19, which has a signal equal to the friction and windage losses; and conductor 20, which has a signal equal to other computable or measurable losses in the alternator, such as stray load losses. Conductor 21 receives the computation of the average mechanical torque into the shaft of the alternator which enters block 22 which has a gain coefficient of $\Omega_0$ where $\Omega_0$ is the average angular velocity of the shaft. The output of block 22 on conductor 23 enters the subtractor 13 with a positive sign. Conductor 11 is connected to subtractor 13 with a negative sign. The output of subtractor 13 is conductor 24, which has a signal marked $\Delta P$, net accelerating power; this signal is proportional to the average mechanical power input less the sum of all the output power flows, the power losses, and the time rates of increase of stored energy in the alternator. Conductor 24 is the input to block 25, which has a gain coefficient of $1/J\Omega_0$. J is the moment of inertia of the mechanical rotating portion of the alternator and steam turbine. The output of block 25 appears on conductor 26 and is an acceleration signal which can be used for control purposes, for metering and for computation of the velocity. Conductor 26 provides the input to the integrator 27 whose output on conductor 28 is the computed approximate negative velocity change of the shaft of the alternator.

The operational divider 12 receives a numerator input from conductor 11 and receives a denominator input from conductor 29. The output of operational divider 12 on conductor 30 enters with positive polarity a subtractor 31 whose output on conductor 32 enters a gain coefficient block 33 with a gain of $1/J$, where J is the moment of inertia of the rotating portion of the alternator and turbine. The output of block 33 appears on conductor 34 which goes to a terminal 35 which is the computed net acceleration of the shaft available for measuring, indicating, computing, and control purposes. Conductor 34 also provides the input to the operational integrator 36 whose output appears on conductor 37. Conductor 37 is connected to three devices, one of which is a terminal 38 which provides an output proportional to the shaft velocity change for measurement, indication, computational, and control purposes. Conductor 37 also provides the input to block 39 which has an operational gain coefficient $k_m$ which is the dynamic turbine characteristic, usually negative, in units of change in torque delivered per unit change in angular velocity. The output of block 39 appears on conductor 40 which is one input to summer 41. The other input to summer 41 comes from conductor 21a which, like conductor 21, also delivers a signal proportional to the average mechanical shaft torque delivered by the turbine. The output of summer 41 is therefore the average mechanical torque signal plus the output of block 39 appearing on conductor 40. The output of summer 41 appears on conductor 42 and enters the subtractor 31 with a negative sign. The signal on conductor 32 is the output of subtractor 31, and is therefore equal to the signal on conductor 30 minus the signal on conductor 42. Conductor 37, in addition to being the input to block 39 and to terminal 38 which is available to provide a signal proportional to velocity change for measurement, indication, calculation, and control purposes, is also connected to a summer 43 with a positive sign and a conductor 44 is also connected to summer 43 with a positive sign. Conductor 44 carries a signal which is a measure of the average past frequency designated $\Omega_0$. The output of summer 43 appears on conductor 29 which, as previously mentioned, is the denominator input to divider 12.

Blocks 25, 22, 33 and 39 can be gain adjustments with potentiometers or may be isolating amplifiers with adjustable gain generally called operational amplifiers, both of which are well known in the art; blocks 27 and 36 are operational integrators of the type which have a high gain operational amplifier with capacitive negative feedback, also well known in the art. As shown in FIG. 1 these integrators have a sign change between input and output. Block 12 is an operational divider which may be an assembly of an operational amplifier and an operational multiplier in feedback as, for example, that given in the Burr-Brown multipliers-dividers catalog of Apr. 1968, No. PDS-201A, on page 3 in FIG. 1. Alternatively, block 12 may consist of an operational amplifier made by Zeltex, Incorporated a subsidiary of Redcor Corporation, as given in their catalog entitled "Operational Amplifiers," Mar., 1969 in conjunction with a multiplier Model 602 in feedback as given on page 9 of the aforementioned catalog.

Figure 2:
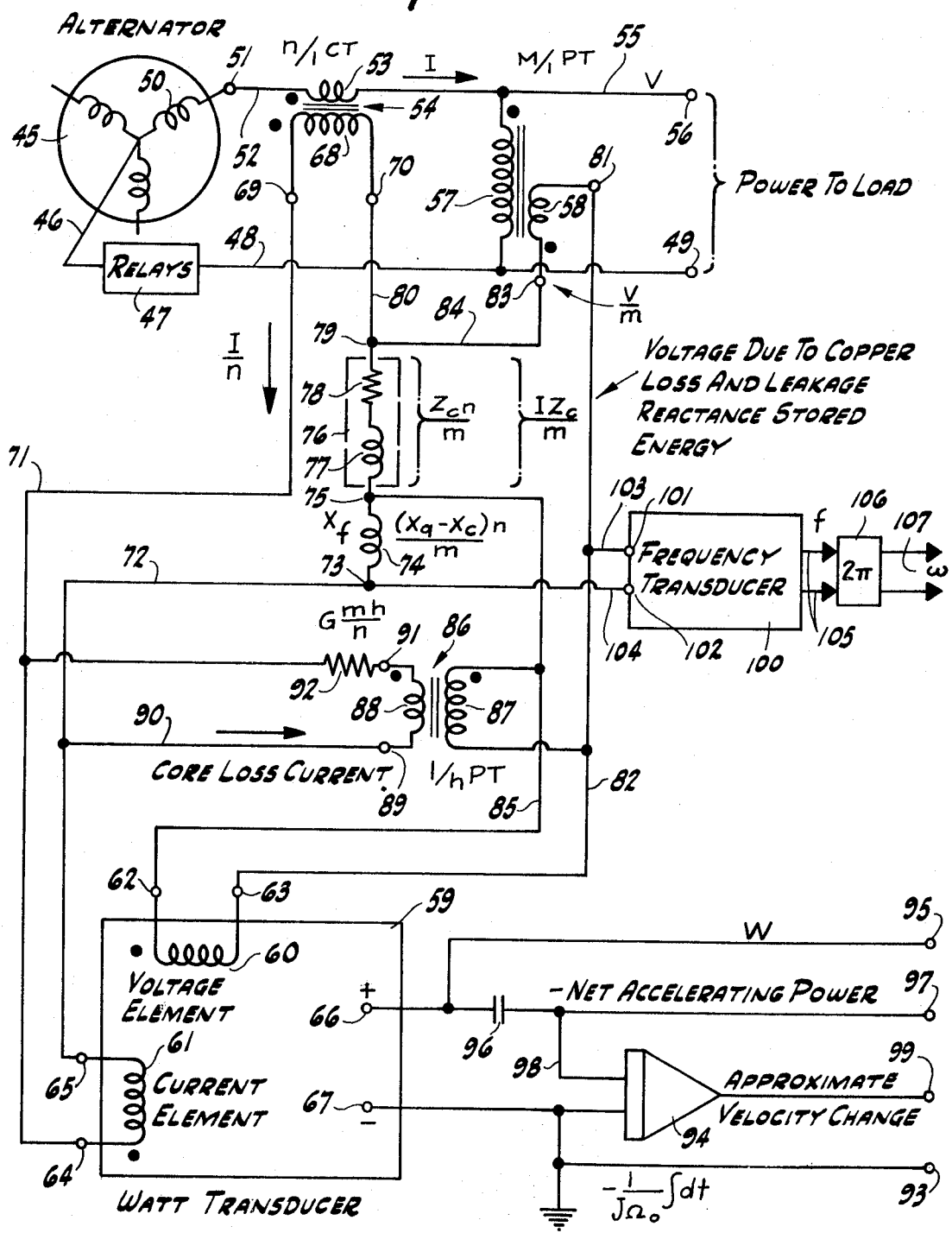
FIG. 2 shows a circuit diagram and block diagram illustrating the manner in which the accelerometer and tachometer of this invention are connected to an alternator.

FIG. 2 shows a circuit diagram and block diagram of the connection to an alternator of the accelerometer and tachometer described in the specification. In FIG. 2 a multiphase alternator 45 has an armature center tap 46 connected through conventional grounding reactors and fault detecting relays generally illustrated by reference numeral 47 to ground bus 48 which is connected to terminal 49, which is part of the circuit delivering power to the useful load at the end of a transmission line. One of the phases 50 of the alternator 45 is connected through terminal 51 to a bus 52 feeding the primary 53 of a current transformer 54 and thence by conductor 55 to terminal 56 which is another terminal of the circuit delivering power to a useful load through a transmission line. Between conductor 55 and ground bus 48 is connected the primary winding 57, of a potential transformer whose secondary winding 58 provides a voltage proportional to the terminal voltage of the alternator. A watt transducer 59, which can be of a conventional type, manufactured by the Noller Control System in Richmond, California, contains a voltage element 60 and a current element 61, each with two external terminals. Terminals 62 and 63 are connected to the voltage element, and terminals 64 and 65 are connected to the current element. The output of the watt transducer 59 appears on terminals 66 and 67 which are connected to external indicating, measuring, computing, and control circuits. The polarization of the watt transducer 59 is such that if the voltage drop from terminal 62 to terminal 63 is in phase with the current flowing from terminal 64 through the current element and out of terminal 65 then the output terminal 66 will be positively poled with respect to output terminal 67.

The secondary winding 68 of current transformer 54 has a positively marked terminal 69 and a negatively marked terminal 70. Terminal 69 is connected by means of conductor 71 to terminal 64 of the current element 61 of the watt transducer 59. Terminal 65 is connected by conductor 72 to junction 73 to which also is connected one terminal of a reactance 74, the other terminal of which is connected to junction 75. An impedance 76, consisting of a reactance 77 and a resistance 78 in series, has one terminal connected to junction 75 and the other terminal connected to junction 79. Junction 79 is connected by a conductor 80 to terminal 70 of the secondary of current transformer 54.

The potential transformer secondary winding 58 has a negatively poled terminal 81 which is connected by conductor 82 to terminal 63 of the voltage element 60. The other end of winding 58 has its positively poled terminal 83 connected by a conductor 84 to junction 79. From junction 75 conductor 85 makes a connection to terminal 62 of voltage element 60. Current transformer 54 has a current transformation ratio of $n$ amperes on the primary to 1 ampere on the secondary, or a turns transformation ratio of one turn on the primary to $n$ turns on the secondary. The potential transformer having a primary 57 and a secondary 58 has a potential ratio of $m$ volts on the primary to 1 volt on the secondary and a corresponding turns ratio of $m:1$. The current I in conductor 55 is therefore transformed into the current $I/n$ in conductor 71. Likewise, the voltage V between terminals 56 and 49 is transformed into the voltage $V/m$ between terminals 81 and 83.

The power component of current flows from terminal 69 through conductor 71 into terminal 64 of current element 61 and then out of terminal 65 through conductor 72, through reactance 74, reactance 77, resistance 78 and conductor 80 back to terminal 70. The measured voltage that appears between terminals 81 and 83 is impressed across the voltage element 60 along with a voltage drop that exists between terminals 75 and 79 due to the power component current flowing through reactance 77 and resistance 78. The watt transducer 59 therefore measures the power to the load from the alternator 50 divided by $nm$ plus the power lost in resistance 78. This resistance 78 is so chosen as to model the copper losses within the alternator 45, and suitable procedures for determining the copper losses for a given alternator or type of alternator are well known in the art.

The watt transducer 59 shown in FIG. 2 can be of the type described in the article by Bock Lee and Wilson Pritchett: "-Magnetic Core Four Quadrant Multiplier Circuit Watt Transducer," IEEE Transactions on Power Apparatus and Systems, Vol. PAS-83, No. 7, July 1964, Pages 692-695, which transducer is also described in U.S. Pat. No. 3,219,808 entitled "Electrical Multiplier," which issued Nov. 23, 1965.

In addition in FIG. 2 there is shown a potential transformer 86, whose primary winding 87 is connected between terminals 62 and 63 and whose secondary winding 88 has one terminal, 89, connected by a conductor 90 to terminal 65. The other terminal, 91 of secondary winding 88 is connected through a conductance 92 to terminal 64. Transformer 86 has a primary-to-secondary turns ratio of $h$ turns on the primary to one turn on the secondary and a corresponding voltage stepdown ratio of $h:1$. A voltage proportional to the alternator generated voltage is therefore impressed across conductance 92 and causes a current component proportional to the product of the generated voltage and the magnitude of conductance 92 to flow from terminal 91 through conductance 92 into terminal 64 through current element 61 and out of terminal 65 through conductor 90 and into terminal 89 of secondary winding 88. This additional current component passing through current element 61 in phase with the voltage in voltage element 60 causes the watt transducer 59 to read an additional component on its output. The magnitude of the conductance 92 is chosen so that the additional component due to the current in conductor 90 models the losses in the iron of the alternator 45, commonly called core loss, and in particular models the eddy current losses in the iron of the alternator.

Output terminal 67 of the watt transducer 59 is connected to a terminal 93 which is connected to the ground input to an operational integrator 94. Output terminal 66 of the watt transducer 59 is connected to a terminal 95 and through a capacitor 96 to a terminal 97. Terminal 97 is also connected by conductor 98 to the input of the operational integrator 94. The output of operational integrator 94 is connected to a terminal 99.

The voltage appearing between terminals 66 and 67 of the watt transducer 59 is proportional to the power delivered by the alternator 45 plus the copper losses and the core losses. This voltage is the signal marked W and appears between terminals 95 and 93.

The average value of the voltage between 95 and 93 appears across capacitor 96. If the shaft input power is constant, then this voltage is proportional to the shaft input power. The voltage between terminals 97 and 93 is equal to the voltage between terminals 95 and 93 less the average amount of this voltage which has charged up capacitor 96. Therefore the changes in power flow in the alternator appear between terminals 97 and 93. Changes in the output power are proportional to negative acceleration; consequently the voltage on the terminal 97 represents net negative accelerating power.

The equation for the operational integrator 94 is $-1/J\Omega_0$ times the time integral of the voltage between terminals 97 and 93. The integration gain constant is chosen so that the output of the integration is proportional to the change in velocity of the shaft of alternator 45. This velocity change appears between terminals 99 and 93.

Also shown in FIG. 2 is a frequency transducer 100 which measures the average frequency of a signal presented to it and delivers a voltage proportional to this average frequency. Frequency transducer 100 has input terminals 101 and 102. Terminal 101 is connected to terminal 81 by conductor 103. Terminal 102 is connected by conductor 104 to junction 73 which is the junction between conductor 72 and reactance 74. The input to the frequency transducer 100 which appears between terminals 101 and 102 is proportional to the power-line voltage delivered by the potential transformer having primary winding 57 and secondary winding 58 plus the resistance and quadrature axis reactance drop internal to alternator 45 as modelled by the voltage appearing between junction 79 and junction 73. The input to the frequency transducer 100, therefore, has a phase closely proportional to the phase of the field $mmf$ motion within the alternator 45 which is closely proportional to the instantaneous phase of the shaft and the field structure of alternator 45. The output of frequency transducer 100 appears on circuit 105 which enters a gain block 106 which has a numerical gain of $2\pi$. The output of the gain block 106 appears on a two-wire circuit 107 which delivers a voltage proportional to the angular radian frequency of the shaft of the alternator.

Because of the sampling nature of the frequency transducer 100, there is a ripple or noise component in the signal occurring on the two-wire circuit 107. This signal, therefore, has good low frequency properties but poor high frequency properties.

Because of the high pass characteristics of the capacitor 96, the signals appearing at terminal 97 and the integrated signal appearing at terminal 99 do not have good low frequency fidelity. But because of the noise filtering effect of the integrator 94, the signal appearing on terminal 99 has excellent high frequency properties. The signals, therefore, on 107 and 99 taken together provide a new and improved method of measuring both the low frequency and the high frequency shaft velocity components.

Figure 3:
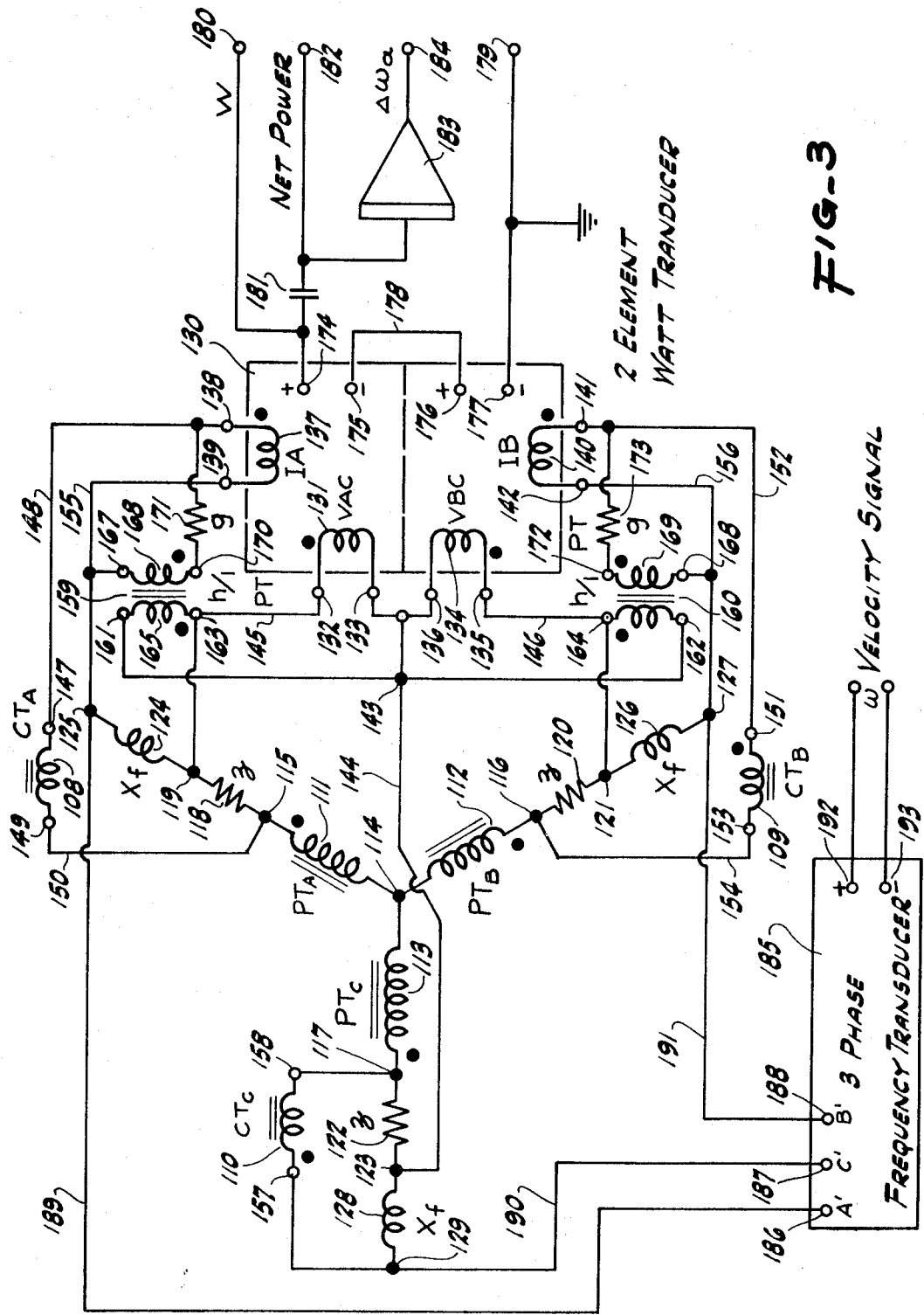
FIG. 3 is a specific circuit diagram and block diagram for a three-phase embodiment of the accelerometer and tachometer of this invention applied to a three-phase alternator.

FIG. 3 is a circuit diagram and block diagram similar to FIG. 2 but of a three-phase embodiment of the accelerometer and tachometer of this invention applied to a three-phase alternator having phases A, B and C. FIG. 3 is to be read in conjunction with the alternator-to-load circuit of FIG. 2 which shows one phase of the alternator having a current transformer and potential transformer therein. In FIG. 3, each phase of an alternator has both a current transformer and a potential transformer. The secondaries of the three current transformers in the lines between the alternator and the load are shown in FIG. 3 as 108 for phase A, 109 for phase B and 110 for phase C. The secondaries of the three potential transformers are shown in FIG. 3 as 111 for phase A, 112 for phase B and 113 for phase C. A center tap junction 114 is connected to one terminal of each of windings 111, 112 and 113. The high voltage positively poled terminals of windings 111, 112 and 113 are respectively 115, 116 and 117. An impedance $z$ identified by reference numeral 118 is connected between terminals 115 and 119. An identical impedance $z$ identified by reference numeral 120 is connected between terminals 116 and 121. Similarly, an identical impedance $z$ identified by reference numeral 122 is connected between terminals 117 and 123.

A reactance 124 of magnitude $X_f$ is connected between terminal 119 and a terminal 125. A reactance of identical value 126 is connected between terminal 121 and a terminal 127. A third reactance 128 of identical value $X_f$ is connected between terminal 123 and a terminal 129.

A two-element watt transducer 130 for three-phase power measurements is provided in FIG. 3. This transducer has a voltage coil 131 for connection between phase A and C with a positive poled terminal 132 and a negative poled terminal 133 and a second voltage coil 134 for connection between phases B and C with a positive poled terminal 135 and a negative poled terminal 136. The watt transducer 130 has a current coil 137 for use in phase A with a positive poled terminal 138 and a negative poled terminal 139. It has a second current coil 140 for use in phase B with a positive poled terminal 141 and a negative poled terminal 142.

Terminals 133 and 136 are each connected to a terminal 143 and terminal 143 is connected by a conductor 144 to terminal 123. Terminal 132 is connected by conductor 145 to terminal 119. Terminal 135 is connected by a conductor 146 to terminal 121. These connections provide the two-element three-phase watt transducer 130 with the three-phase voltages appearing between the three junctions 119, 121 and 123.

The secondary winding 108 of the current transformer for the A phase has its positive poled terminal 147 connected by conductor 148 to terminal 138. The negative poled terminal 149 of winding 108 is connected by a conductor 150 to terminal 115. The secondary 109 of the B-phase current transformer has its positive poled terminal 151 connected by a conductor 152 to terminal 141. The negative poled terminal 153 of winding 109 is connected by a conductor 154 to terminal 116. A conductor 155 connects terminal 125 to terminal 139. A conductor 156 connects terminal 127 to terminal 142. These connections are such that the A-phase current transformer has secondary current flowing out of terminal 147 through conductor 148 into terminal 138, through current element 137 of the watt transducer 130, out of terminal 139 through conductor 155 into terminal 125, through reactance 124, terminal 119, impedance 118, terminal 115, and through conductor 150 back to terminal 149 and winding 108. In a similar manner the B-phase secondary 109 of the current transformer has current which flows out of terminal 151 through conductor 152 into terminal 141, through winding 140, terminal 142, conductor 156, terminal 127, reactance 126, impedance 120, terminal 116, conductor 154, and terminal 153 into winding 109.

The C-phase current transformer secondary 110 has its positive poled terminal 157 connected to terminal 129 and its negative poled terminal 158 connected to terminal 117. This circuit is such that the C-phase secondary current flows through winding 110 into terminal 129, through reactance 128, terminal 123, impedance 122, terminal 117 and back into winding 110.

The current flows just described and the voltages presented to the two-element watt transducer 130 produce a totalized wattage measurement by the watt transducer proportional to the power flow out of the alternator plus the copper losses that occur in the windings therein.

In addition in FIG. 3 there are provided two potential transformers, 159 and 160, whose negative poled primary terminals 161 and 162 are connected to terminal 143 and whose positive poled primary terminals 163 and 164 are connected to terminals 132 and 135, respectively. The primary 165 of transformer 159 therefore receives the potential between terminals 132 and 133. The primary 166 of transformer 160 similarly receives the potential between terminals 135 and 136. The negative poled terminal 167 of the secondary 168 of transformer 159 is connected to terminal 139 by conductor 155. The negative poled terminal 168 of the secondary 169 of potential transformer 160 is connected to terminal 142 by conductor 156. The positive poled terminal 170 of the secondary 168 of transformer 159 is connected through conductance 171 to terminal 138. The positive poled terminal 172 of the secondary 169 of transformer 160 is connected through a conductance 173 to terminal 141. Conductances 171 and 173 have the value g, which models the core losses within the alternator. These potential transformers have a primary-to-secondary turns ratio and voltage ratio of h:1. The current component produced by transformer 159 flows from the secondary winding 168 through conductance 171 into terminal 138, out of terminal 139, through conductor 155 and back to terminal 167. The secondary current of transformer 160 flows out of the secondary winding 169 in and through conductance 173, into terminal 141, out of terminal 142, through conductor 156, and into terminal 168. These components of current in the current coils of the two-element watt transducer 130 add a component to the output signal which is proportional to the eddy current losses within the alternator. The A-phase element of the watt transducer 130 has a positive poled output terminal 174 and a negative poled output terminal 175. The B-phase element of the watt transducer has a positive poled output terminal 176 and a negative poled output terminal 177. Terminal 175 and 176 are connected together by conductor 178. Terminal 177 is connected to output terminal 179. Terminal 174 is connected to output terminal 180 such that the voltage difference between 180 and 179 is proportional to the wattage flowing on the power line from the alternator to the load plus the copper and core losses within the alternator. This voltage is designated W. A capacitor 181 is connected in series between terminal 174 and terminal 182. This capacitor provides a path for only the high frequency components of the voltage variations on terminal 174. Therefore the voltage between terminal 182 and 179 is proportional to the changes in the a-c electrical power flow and losses of the alternator. Terminal 182 is connected to the input of operational integrator 183 whose output on terminal 184 is so scaled as to be proportional to changes in the velocity of the shaft of the alternator.

The signal between terminal 182 and terminal 179 is proportional to changes in shaft negative acceleration and may be used for indication, measurement, computation and control. The signal between terminals 184 and 179 is proportional to the change in the shaft velocity of the alternator and may be used for measurement, for indication, for computation, and for control.

FIG. 3 also shows a three-phase frequency transducer 185 with input terminals 186, 187 and 188 marked Phase A', Phase C', and Phase B', respectively. Terminal 186 is connected by conductor 189 to terminal 125. Terminal 187 is connected by a conductor 190 to terminal 129; and terminal 188 is connected by a conductor 191 to terminal 127. The three junctions, 125, 127 and 129 have a three-phase alternating voltage which is proportional to the voltage behind the quadrature axis reactance of the alternator. This voltage is approximately in phase with the field $mmf$ rotating in the air gap of the alternator and this voltage is also approximately in phase with the mechanical motion of the shaft and the field structure. The three-phase frequency transducer 185 has a pair of output terminals marked 192 and 193, respectively. Between these output terminals there appears a voltage proportional to the radian angular speed of the shaft of the alternator. The frequency transducer 185 may be any of the well known commercial types available; or, alternatively it may be of an improved type as disclosed in a copending application.

In FIG. 3 the impedance z is equal to the armature winding resistance and leakage reactance $Z_c$ times the turns ratio $n/m$. The equivalent eddy-current conductance of the core of alternator 45 is G. The conductance $g$ is equal to G times the turns ratio $mh/(2n)$. The reactance $X_f$ is equal to the quadrature axis reactance less the leakage reactance times the turns ratio $n/m$. $X_f = (X_q - X_c)n/m$.

Figure 4:
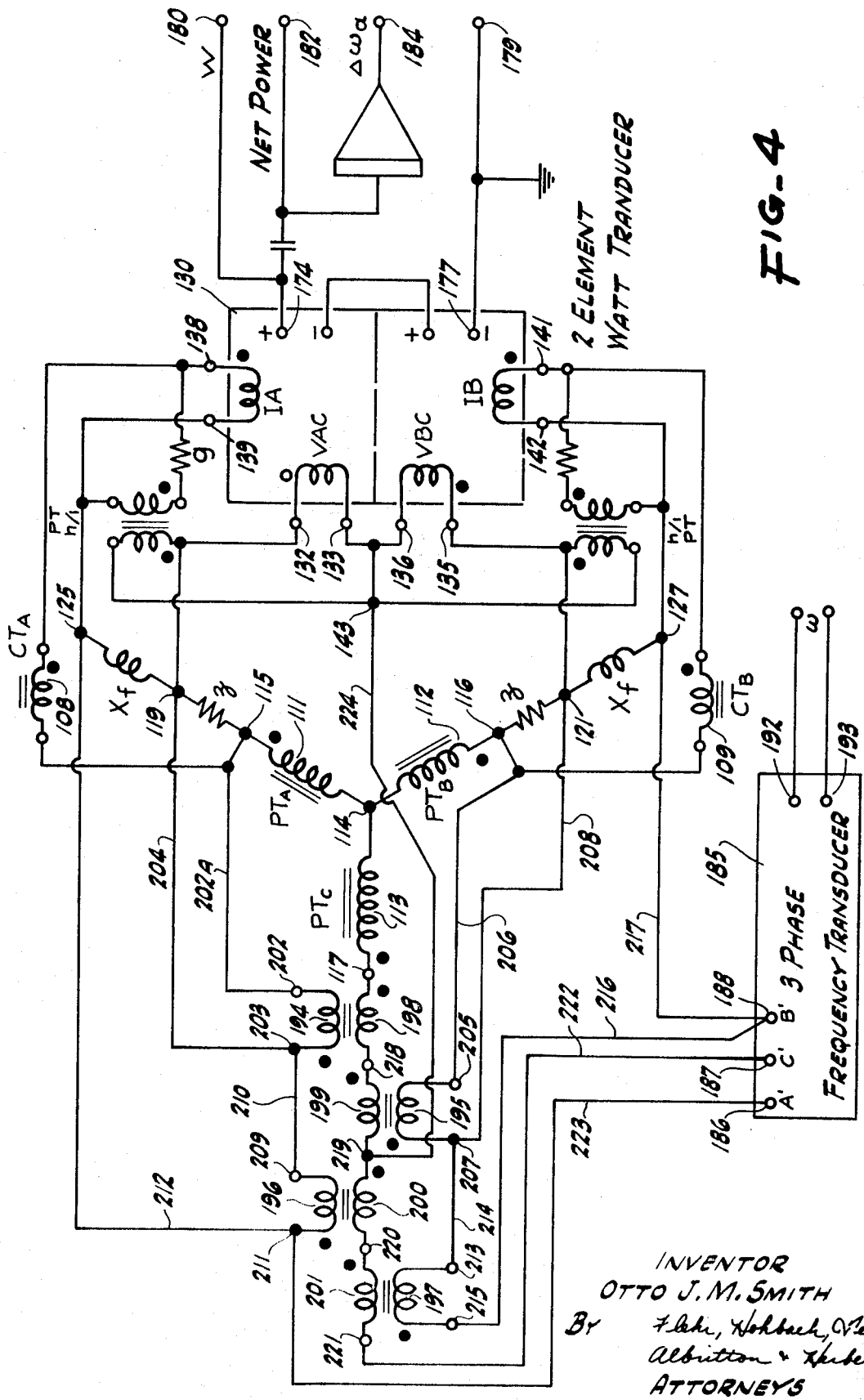
FIG. 4 is a circuit diagram and block diagram of an accelerometer and tachometer in accordance with this invention for use with the alternator of FIG. 2.

FIG. 4 is a circuit diagram and block diagram of an accelerometer and tachometer in accordance with this invention for use with the alternator such as shown in FIG. 2. FIG. 4 accomplishes the same result as FIG. 3 but does so without the use of a current transformer in phase C. In FIG. 4, terminals 180, 182, 184 and 179, respectively are the same as the same numbered terminals in FIGS. 3. These terminals have signals proportional to the shaft minus acceleration, change in acceleration, change in velocity, and ground, respectively. In FIG. 4 terminals 192 and 193 on the three-phase frequency transducer 185 are the same as the same numbered terminals in FIG. 3. Between these terminals is a voltage proportional to shaft velocity. In FIG. 4 terminals 115, 116, 119, 121, 125 and 127 and terminals 186, 187 and 188 are the same as the equivalently numbered terminals in FIG. 3.

In FIG. 4 there are four isolation transformers with the primary windings designated 194, 195, 196 and 197, respectively. The secondary windings of these same isolation transformers are designated 198, 199, 200 and 201, respectively. The unpoled terminal 202 of winding 194 is connected by a conductor 202A terminal 115. The poled terminal 203 of winding 194 is connected by a conductor 204 to terminal 119. The unpoled terminal 205 of winding 195 is connected by a conductor 206 to junction 116. The poled terminal 207 of winding 195 is connected by a conductor 208 to terminal 121. The unpoled terminal 209 of winding 196 is connected by a conductor 210 and conductor 204 to terminal 119. The poled terminal 211 of winding 196 is connected by a conductor 212 to terminal 125. The unpoled terminal 213 of winding 197 is connected by a conductor 214 and conductor 208 to terminal 121. The poled terminal 215 of winding 197 is connected by a conductor 216 to terminal 188. Terminal 188 is connected by conductor 217 to terminal 127. The center tap of the potential transformers is designated junction 114 in FIG. 4, the same as in FIG. 3. The potential transformer for the C-phase has a secondary winding designated 113 connected between junction 114 and terminal 117. The poled end of winding 198 is connected to terminal 117 and the unpoled end of winding 198 is connected to terminal 218. The poled end of winding 199 is connected to terminal 218 and the unpoled end of winding 199 is connected to terminal 219. The poled end of winding 200 is connected to terminal 219 and the unpoled end of winding 200 is connected to terminal 220. The poled end of winding 201 is connected to junction 220 and the unpoled end of winding 201 is connected to a terminal 221. The conductor 222 is connected between terminal 221 and terminal 187. Conductor 223 connects terminal 186 to the poled end of winding 196 and also through conductor 212 to terminal 125. Terminal 219 is connected by conductor 224 to terminal 143 which is the same as 143 in FIG. 3. Junction 143 provides the C-phase voltage for the well-known 2-watt meter method of power measurement whereby each of the elements in the watt transducer 130 has one terminal connected to junction 143.

Windings 198 and 199 introduce into the phase C voltage a computed voltage equal to the transformed $IZ_c$ drop within the copper and leakage inductance of the alternator. Windings 200 and 201 introduce into the voltage delivered on he terminal 187 marked Phase C' of the three-phase frequency transducer 185, a voltage component equal to the transformed $IX_f$ drop in the alternator which makes the voltage on 187 equal to the transformed voltage behind behind quadrature axis reactance inside the alternator. FIG. 4 uses a voltage computation to accomplish the same result as the current transformer in Phase C accomplishes in FIG. 3 by introducing the current through two impedances.

Figure 5:
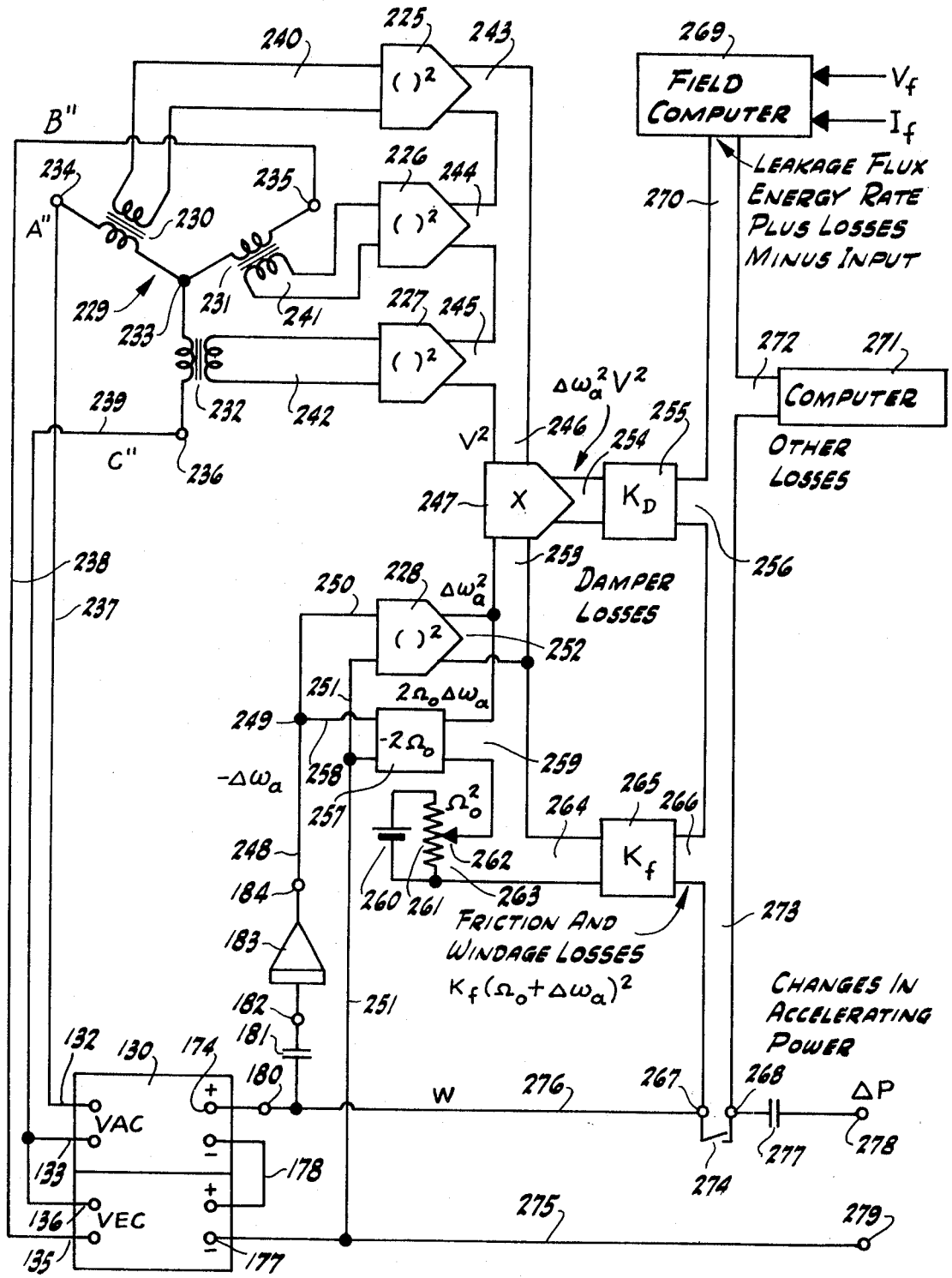
FIG. 5 is a block diagram of an apparatus for compensating for losses others than core and copper in the alternator for computation of accelerating power.

FIG. 5 is a block diagram of apparatus for compensating for losses other than core and copper losses in the alternator in the computation of accelerating power. FIG. 5 shows connections to be made to the watt transducer 130 of FIG. 3 or FIG. 4. This watt transducer 130 has input voltage terminals 132, 133, 136 and 135 which are the same as the correspondingly numbered terminals in FIG. 3 and has output terminals 174 and 177 which are the same as the correspondingly numbered terminals in FIG. 3. In FIG. 5 there are provided four operational squaring modules denoted by 225 through 228. A three-phase transformer bank, 229, provides isolation for the inputs to the first three squaring modules. In this transformer bank are three transformers, 230, 231, and 232. The primary winding of 230 is connected between center tap junction 233 and a terminal 234. The primary winding of transformer 231 is connected between center tap junction 233 and a terminal 235. The primary winding of transformer 232 is connected between center tap junction 233 and a terminal 236. Conductor 237 is connected between terminal 234 and terminal 132. Conductor 238 is connected between terminals 235 and 135. Conductor 239 is connected between terminal 236 and terminals 136 and 133. The secondary winding of transformer 230 is connected to the two-wire circuit 240 which is the input to squaring module 225. The secondary winding of transformer 231 is connected to the two-wire circuit 241 which is the input to squaring module 226 and the secondary winding of transformer 232 is connected to the two-wire circuit 242 which is the input to the squaring module 227. The two-wire output circuits, 243, 244, and 245 are the outputs of squaring modules 225, 226 and 227, respectively. These three output circuits are connected in series to form the two-wire circuit 246 which contains a voltage which is the sum of the outputs of the three squaring modules. Circuit 246 is one input to an operational multiplier 247.

Shown in FIG. 5 is capacitor 181 connected to terminal 174 and providing an input to an operational integrator 183 whose output appears on terminal 184. This circuit is also shown in FIG. 3 with the same numerical designations. In FIG. 5 the high potential input to the squaring module 228 is provided by conductor 248 from terminal 184 to junction 249 and by conductor 250 from junction 249 into the input of the operational squaring module 228. The low potential to squaring module 228 is provided by conductor 251 to terminal 177. The output of squaring module 228 appears on two-wire circuit 252 which is connected to the two-wire circuit 253 which is another input to the multiplier module 247. The output of operational multiplier 247 appears on two-wire circuit 254 and is the input to gain block 255. The output of gain block 255 appears on the two-wire circuit 256.

The signal on circuit 246 is proportional to the square of the generated voltage in the alternator and is also proportional to the square of the flux in the alternator. The signal on circuit 253 is proportional to the square of the angular velocity deviation in the alternator which is also proportional to the square of the frequency induced in the damper windings in the alternator. The signal on circuit 254 is proportional to the product of the flux squared times the frequency squared which is proportional to the square of the voltage induced in the damper windings. The gain constant in block 255 is designated $K_D$, and this is proportional to the conductance of the damper windings in the alternator. The voltage on circuit 256 is therefore proportional to the losses in the damper windings of the alternator.

The gain block 257 in FIG. 5 has an input provided by conductor 258 from junction 249 to the high potential input of 257 and by conductor 251 from terminal 177 to the low potential input to gain block 257. The output of gain block 257 appears as the two-wire circuit 259 which has a signal proportional to the velocity deviation and also proportional to the gain of block 257. The gain of block 257 is chosen as $-2\Omega_0$ so that the signal on circuit 259 is proportional to $2\Omega_0\Delta\omega_a$.

The battery 260 in FIG. 5 is connected across a potentiometer 261 whose slider 262 is positioned so that the output voltage appearing on two-wire circuit 263 is proportional to the magnitude of the synchronous radian frequency squared, $\Omega_0^2$. The voltages on circuits 252, 259 and 263 are added together by connecting the circuits in series to form a composite two-wire output circuit 264. The voltage on circuit 264 is therefore proportional to $$\Delta\omega_a^2 + 2\Omega_0\Delta\omega_a + \Omega_0^2 = (\Omega_0 + \Delta\omega_a)^2$$

A gain block 265 receives an input from two-wire circuit 264 and delivers an output on two-wire circuit 266. The gain of this block is chosen to be $K_f$ which is proportional to the friction and windage losses in the alternator. Changes in the signal which appears on two-wire circuit 266 are therefor proportional to changes in the friction and windage losses due to changes in speed because they vary approximately as a function of the square of the speed of the shaft of the alternator.

The signals on circuits 256 and 266 are added to W to produce a sum of the alternator output power plus copper, core, damper and frictional losses. The sum is produced by the series connection of circuits 266 and 256 between terminals 267 and 268, and conductor 276 between terminals 267 and 180 producing the sum signal between terminal 268 and terminal 177.

The purpose of the computations in FIG. 5 is to add to the measured wattage delivered by the alternator the copper losses and core losses and the further additional computable losses such as the damper losses and the friction and windage losses. In addition to these easily computable losses it is within the scope of this invention to provide for the computation of other losses that might be significant in obtaining a very accurate measure of the power balance within the alternator. For example, the stray load loss could be computed as a function of the product of the windings currents and the fluxes. The hysteresis loss and the tooth frequency losses could also be computed.

Under the usual steady state operating conditions the field current and the flux inside the alternator are relatively constant. Even during transients which involve changes in the angular velocity and the angle of the shaft, the main flux is relatively constant. But if the transients are being quenched by an optimal control of field voltage and current, and if supplementary signals proportional to shaft acceleration and to shaft velocity are being introduced into the exciter system, then the field voltage and current transients may be significant. Rapid changes of field current produce rapid changes of armature current, and the corresponding power flows should be correctly modeled. For this eventuality, there is provided in FIG. 5 a field computer 269 which receives signals proportional to the measured field voltage and field current and which calculates the loss in the copper winding of the field plus the time rate of change of energy going into the leakage inductance of the field minus input power flows to the field from the exciter system. This composite computation is treated in the same manner as armature losses and damper and friction and windage losses. It is shown in FIG. 5 by the field computer 269 delivering a signal on the two-wire circuit 270. In addition a computer 271 delivers a signal on the two-wire circuit 272. This latter signal may be proportional to hysteresis and to stray load losses. Two-wire circuit 273 is formed by the series connection of two-wire circuits 256, 266, 270 and 272. The voltage on circuit 273 is therefore the sum of the voltages on circuits 256, 266, 270 and 272. The two-wire circuit 273 is connected to terminals 267 and 268. Also connected between these two terminals is switch 274 shown in the open position. Conductor 276 connects terminal 267 to terminals 180 and 174. Conductor 275 connects terminal 177 to a terminal 279. Capacitor 277 is connected in series between terminal 268 and 278. The series connection of terminals 174 and 180, conductor 276, terminal 267, circuit 273, terminal 268, capacitor 277 and terminal 278 provides an output voltage between terminal 278 and terminal 279 which is the sum of the output voltage of the watt transducer 130 and the losses signals on circuit 273. This voltage between terminals 278 and 279 is therefore an accurate measure of the changes in the accelerating power considering all of the computable losses within the alternator and assuming that the shaft power flow coming from the turbine to the alternator is constant.

It is within the scope of this invention to also include in computer 271 in FIG. 5 signals from the turbine inlet pressure and turbine inlet valve position and a computation of shaft power flow and changes in shaft power flow responsive to such pressure and such position. The shaft power flow changes are added into the signal on circuit 272 as negative loss changes. This is in accord with FIG. 1 wherein computed changes in shaft torque are delivered by conductor 42 ultimately into conductor 32 with a negative sign.

FIG. 5 in conjunction with FIG. 3 models that portion of FIG. 1 designated "Summer 10, Power Flow 11, Subtractor 13, and Net Accelerating Power ΔP on Circuit 24." The field power flow component on circuit 14 in FIG. 1 is provided by the field computer 269. The armature power flow component on circuit 14 in FIG. 1 is provided by the watt transducer 130. The copper loss and iron loss components 15 and 16 in FIG. 1 are provided by the voltage and current components introduced into watt transducer 130 in accordance with the circuit of FIG. 3. The damper loss on circuit 17 and friction and windage loss on circuit 19 are computed in FIG. 5 and delivered on circuits 256 and 266, respectively. The magnetic energy change rates on circuit 18 in FIG. 1 are computed by two different components. In FIG. 3 the inductive component of the impedances z, 118, 120 and 121 properly models the stored energy in the armature leakage reactance. The field computer 269 in FIG. 5 contains a computation of the energy stored in both the mutual inductance linking the armature and the leakage inductance of the field winding which is also a component of 18 in FIG. 1. The signal on 20 in FIG. 1 is provided by the signal on circuit 272 in FIG. 5. The signal on conductor 23 in FIG. 1 is provided by the voltage across capacitor 277 in FIG. 5. The subtractor 13 in FIG. 1 is the series connection of capacitor 277 in FIG. 5 and the remainder of the voltage which is presented between terminal 268 and terminal 279 in FIG. 5. The signal on conductor 24 in FIG. 1 is provided by the potential between terminals 278 and 279 in FIG. 5. Switch 274 in FIG. 5 is provided such that when the switch 274 is closed the computed accelerating power in FIG. 5 is the same as that on terminal 182 in FIG. 3 and does not include the computation of the losses other than copper and core losses.

Figure 6:
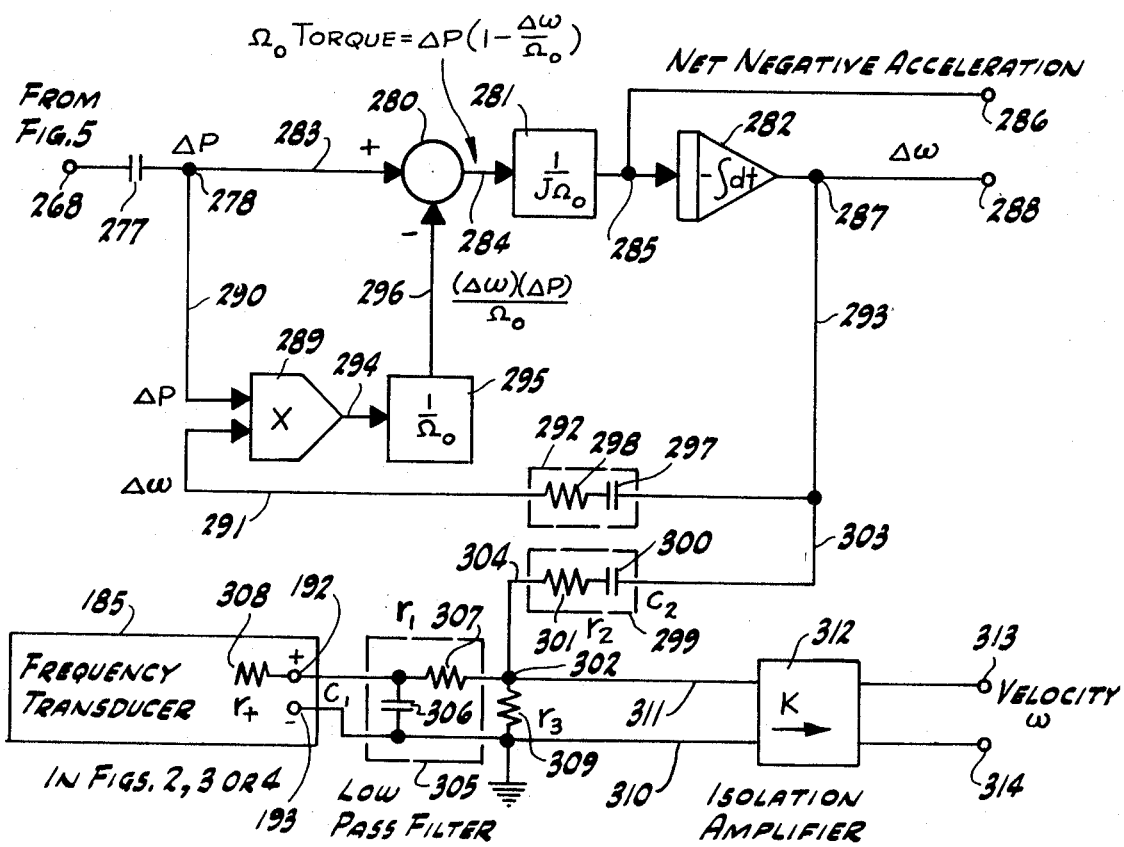
FIG. 6 is a block diagram of an apparatus for the computation of acceleration and velocity for use in conjunction with the apparatus of FIGS. 5 and 3.

FIG. 6 is a block diagram of the computation of acceleration and velocity to be used in conjunction with FIG. 5 and FIG. 3. FIG. 6 performs the same function as the feedback loop in FIG. 1 from terminal 38 through adder 43, conductor 29, and divider 12. In FIG. 6, however, a multiplier is used in such a manner that higher dynamic ranges and higher signal-to-noise ratios are maintained than in FIG. 1. The input signals to FIG. 6 come directly from FIGS. 3 and 5. Frequency transducer 185 and its output terminals 192 and 193 are the same as the correspondingly numbered elements in FIG. 3. Terminal 268, series capacitor 277, and terminal 278 in FIG. 6 are the same as the correspondingly numbered elements in FIG. 5.

In FIG. 6 there is provided a subtractor 280, an operational gain block 281, and an operational integrator 282. A conductor 283 connects terminal 278 to the input of the subtractor 280 with a positive polarity. The output of subtractor 280 is connected by a conductor 284 to the input of the gain block 281. The output of gain block 281 appears at a terminal 285 which is connected to output terminal 286. Terminal 285 also provides the input to the operational integrator 282 whose output is connected to terminal 287 and to output terminal 288.

Gain block 281 has a gain of $/J\Omega_0$. This information flow channel receives the changes in accelerating power from FIG. 5 at terminal 278, and divides the torque by the moment of inertia to obtain an acceleration signal, which appears at terminal 285 and also at terminal 286 where it is available for measurement, indication, computation, and control purposes. The integration of the acceleration signal at 285 by the operational integrator 282 produces a velocity change signal on terminal 288 which is also available for measurement, indication, computation, and control purposes.

The actual torque is the power divided by actual speed, not by the synchronous speed. Therefore the computation in the main channel in FIG. 6, which has already been described, can be corrected by the speed change. This is accomplished by means of the feed-forward feedback branches involving the multiplier.

Operational multiplier 289 receives a feed-forward input from circuit 290 which is connected to terminal 278. Operational multiplier 289 receives a feedback input from circuit 291 which is connected through high pass filter 292 and circuit 293 to terminal 287. The output of operational multiplier 289 appears on circuit 294 which provides the input to a gain block 295. The output of gain block 295 appears on circuit 296 which is an input to subtractor 280 with a negative sign. This combination feedback, feed-forward correction loop computes as follows: On circuit 291 is a signal proportional to the change in speed. On circuit 290 is a signal proportional to the change in power. On circuit 294 is a signal proportional to the change in speed times the change in power. Gain block 295 has a coefficient set at one divided by the synchronous speed. The signal on 296 is equal to change in power times change in speed divided by the synchronous speed or by the past average speed. The signal on 283 is the change in power. The output of the subtractor 280 which appears on circuit 284 is equal to the change in power minus change in power times change in speed divided by average speed. This is therefore equal to the change in power times the quantity (1 − the per unit change in speed). Since the per unit change in speed is very much less than 1, this is effectively equal to the change in power divided by (1 + the per unit change in speed). Mathematically speaking this computation is $$\frac{\Delta P}{1+\frac{\Delta \omega}{\Omega_0}} \simeq \Delta P\left(1-\frac{\Delta \omega}{\Omega}\right)$$

The left side is the desired computation and the right side is the way it is actually computed in FIG. 6.

The advantages of this computation over that in FIG. 1 are that a multiplier is used instead of a divider, and that the dynamic range of the multiplier needs only to consider changes in power and chages in velocity and not total power or total velocity.

Gain block 281 has a gain setting of 1 divided by $J\Omega_0$. The output of this gainblock is therefore negative acceleration. The output of the integrator 282 is therefore change in velocity from the average value of velocity which existed prior to removing the clamp on the integrator 282.

Since multiplier 289 requires only change of velocity signals, it is sufficient to couple from terminal 287 to circuit 291 through a high pass filter 292. This high pass filter consists of a series connection of a capacitor 297 and a resistance 298.

Since circuit 287 delivers only the change in velocity it is not necessary for integrator 282 to have very low frequency response, and therefore it can be a simple low pass RC filter with transference $$T/\left(1+T\frac{d}{dt}\right)$$

which approximates an integration for all angular frequencies above 1/T. In this case there is no sign change in integrator 282, and therefore a sign change can be provided in gain block 281 to keep the loop gain polarity correct.

A second high pass filter 299 is provided consisting of a series capacitor 300 with value $c_2$ and a series resistance 301 with value $r_2$. High pass filter 299 is connected in series between junctions 287 and 302 by conductors 303 and 304. The purpose of high pass filter 299 is to provide at terminal 302 a voltage proportional to the changes in shaft speed. Frequency transducer 185 delivers a voltage between terminals 192 and 193 which is proportional to shaft speed and not just to changes in shaft speed. This signal commonly has a ripple due to the sampled data nature of the frequency transducer or due to the multiple phases from which the frequency transducer 185 obtains its information. For this reason the signals delivered by the frequency transducer are considered to be noisy and are not suitable for differentiation or for obtaining precise measures of small changes in shaft speed. The frequency transducer does deliver, however, valuable information with regard to the absolute speed of the shaft. This valuable information is improved by using a low pass filter 305 consisting of capacitor 306 with value $c_1$ connected between terminals 192 and 193 and a resistance 307 having a value $r_1$, and connected between terminals 192 and 302. The internal impedance of frequency transducer 185 is shown as a resistor 308 with value $r_4$ terminating at terminal 192. The sum of these two informations is provided in resistor 309 of value $r_3$ connected between terminals 302 and 193 by one current component through resistor 307 and another current component through resistor 301 of value $r_2$ delivering current through conductor 304 to terminal 302. To prevent interaction between the low pass and high pass filter, $r_3$ is selected to be much smaller than $r_1$, $r_2$, and $r_4$. Under these conditions, the high pass filter has an infinite frequency gain of $r_3/(r_2+r_3)$ and a time constant of $$T = (r_2+r_3)c_2.$$

Its transference is $$G_{hp} = \frac{r_3}{(r_2+r_3)}\left(\frac{T\frac{d}{dt}}{1+T\frac{d}{dt}}\right)$$

The low pass filter has a zero frequency gain of $r_3/(r_1+r_3+r_4)$. It has a time constant of $$T = \frac{(r_1+r_3)r_4}{r_1+r_3+r_4}c_1.$$

In this embodiment, the two time constants are designed to be equal. The low pass filter transference is $$G_{lp} = \left(\frac{r_3}{r_1+r_3+r_4}\right)\left(\frac{1}{1+T\frac{d}{dt}}\right)$$

In this embodiment, the minimum attenuations of the two filters are set equal.

$$\frac{r_3}{r_2+r_3} = \frac{r_3}{r_1+r_3+r_4}.$$

Therefore a design condition is $r_2 = r_1 + r_4$. A second design condition given by setting the time constants equal is $$(r_2+r_3)^2 = (r_1+r_3)r_4$$

When the inputs to the high pass and low pass filters are both scaled to be in equal units of $\omega$, then the sum output across $r_3$ is given by $$(G_{hp}+G_{lp})\,\omega = \left(\frac{r_3}{r_2+r_3}\right)\left(\frac{1+T\frac{d}{dt}}{1+T\frac{d}{dt}}\right)\omega = \left(\frac{r_3}{r_2+r_3}\right)\omega$$

This pair of filters therefore provides a new and improved infinite bandwidth shaft velocity sensor responsive to rapid shaft fluctuations with a minimum of noise.

When the frequency transducer has very low noise compared to the analog accelerometer, then $T$ should be small. When the frequency transducer has very high noise content compared to the accelerometer, then $T$ should be large.

In FIG. 6 conductors 310 and 311 join terminals 193 and 302 respectively to the input to gain block 312 which is an isolating amplifier with voltage gain of $K$. The output of block 312 appears across terminals 313 and 314, and has a voltage proportional to the angular velocity $\omega$. To make the voltage scaled to be equal to the angular velocity $\omega$, gain $K$ is chosen to be $$K = (r_s+r_3)(r_3)$$

The tee network consisting of resistors 307, 301 and resistor 309 to ground therefore comprises a summer which adds together the low frequency components of velocity from the frequency transducer 185 and the high frequency components of velocity from integrator 282 to provide an improved velocity signal containing both low and high frequency components of velocity between junction 302 and terminal 193. Therefore across output terminals 313 and 314 appears a composite and improved velocity signal containing low frequency high accuracy from the frequency transducer 185 and high frequency high accuracy from integrator 282 from the acceleration signal.

Figure 7:
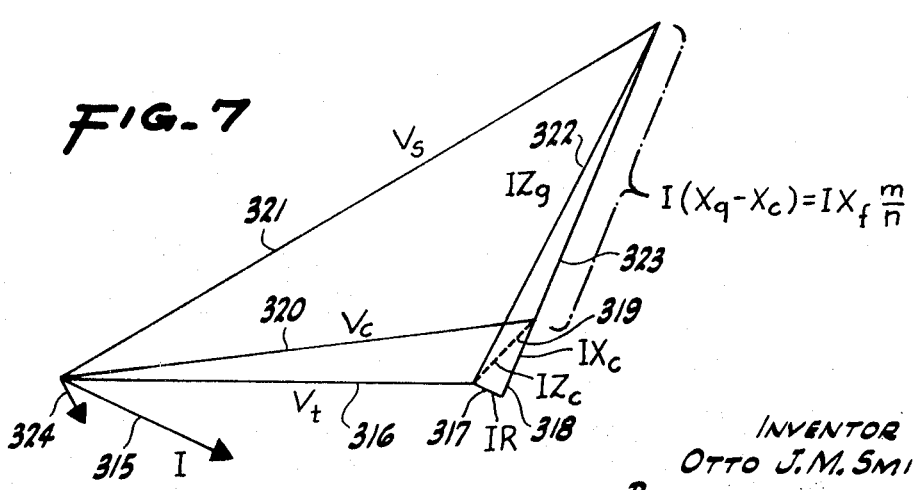
FIG. 7 is a vector diagram of the voltages in the alternator 45 of FIG. 2.

FIG. 7 is a vector diagram of the voltages in the alternator 45 in FIG. 2. It illustrates the purpose of the impedances 74 and 76 in FIG. 2. The line current I exiting from terminal 56 in FIG. 2 is shown as the I phasor 315 in FIG. 7. The terminal voltage between terminals 56 and 49 in FIG. 2 is $V_t$ phasor 316 in FIG. 7. The IR drop in the winding 50 is the phasor 317. The leakage reactance drop in the winding 50 is the phasor 318. The sum of phasors 317 and 318 is phasor 319 marked IZ. The sum of phasors 316 and 319 is phasor 320 marked $V_c$. This phasor 320 is the voltage generated by the flux in the air gap in alternator 45. This is the voltage behind the leakage reactance in the alternator and is proportional to the product of the flux times the speed. The square of this voltage is proportional to the eddy current component of the core loss in the alternator.

The voltage behind quadrature axis reactance is represented by the phasor 321 marked $V_s$. This is the voltage whose phase is approximately equal to the phase of the shaft, and whose phase is approximately equal to the phase of the center line of the field structure inside the alternator. The sum of the resistance drop and the quadrature axis reactance drop is the impedance drop shown as phasor 322 marked $IZ_q$. The difference between the quadrature axis reactance drop and the leakage reactance drop is the phasor 323 which is perpendicular to the current phasor 315 and has a magnitude $I(X_q - X_c)$, where $X_q$ is the quadrature axis reactance and $X_c$ is the leakage reactance. In FIG. 7 the product of phasors 315 and 320 is the product of the current times the core-voltage $V_c$ and is the sum of the power delivered by the alternator and the resistance losses in the winding 50. In addition during transients this product includes the time rate of change of stored energy in the leakage reactance of the armature winding. In order to compute this product in FIG. 2 the voltage $V_c$ and not the voltage $V_t$ is presented to the voltage element of the watt transducer. The voltage $V_c$ is obtained by the addition of the voltages in winding 58 and the drop across impedance 76 and appears between conductors 82 and 85. This voltage is also the voltage proportional to the voltage generated in the iron structure of the armature. Therefore the eddy current losses in this iron structure are proportional to the square of this voltage. Or, another way of computing the eddy current losses is to generate the eddy currents 324 and multiply them by the voltage which generated them. The eddy currents are modelled in FIG. 2 by passing the voltage $V_c$ into transformer 86 such that the voltage on winding 88 is proportional to the voltage generated in the iron of the armature circuit and the conductance 92 is proportional to the conductance of the eddy current circuit and the current in element 61, conductor 90 and through conductance 92 is proportional to the eddy currents in the iron. This current 324, therefore, added to phasor 315 in FIG. 7 produces a power component of 324 in watt transducer 59 equal to the product of the core loss current times the core loss voltage 320 and therefore the watt transducer output will include the eddy current losses in the iron.

The alternator iron losses include hysteresis losses as well as eddy current losses. Hysteresis losses are not exactly proportional to the square of the flux, but for small changes in losses during transients, it is sufficient for the purposes of this invention, to increase the value of the conductance 92 until changes in the output of the watt transducer are equal to the changes in the total hysteresis and eddy current core losses for changes in generated voltage.

Since phasor 321 is the voltage which is in phase with the shaft phase a frequency meter attached to the circuit with this voltage reads the shaft frequency or shaft velocity, even during transients. In order to provide this phasor 321 in FIG. 2 the reactance 74 is provided to carry a current proportional to the line current such that the voltage across reactance 74 between terminals 75 and 73 is proportional to phasor 323 in FIG. 7. Therefore the sum of phasors 316, 317, 318 and 323 is respectively, the sum of the voltages in windings 58 across resistor 78, across reactance 77, and across reactance 74 in FIG. 2 and this sum appears between conductors 103 and 104 as presented to the terminals 101 and 102 of the frequency transducer 100. The frequency transducer terminals therefore receive a voltage in phase with phasor 321.

FIGS. 3 and 4 also generate vector diagrams proportional to that shown in FIG. 7. In FIG. 3 the terminal voltage 316 appears across winding 111. The $IZ_c$ drop in FIG. 7, 319, appears across impedance 118. The phasor 323 appears across reactance 124. The phasor 321 appears between terminals 125 and 114. The phasor 320 appears at the input to the watt transducer between terminals 132 and 133. It is also the voltage presented to transformer 159 to produce a current through the core loss conductance 171.

Figure 8:
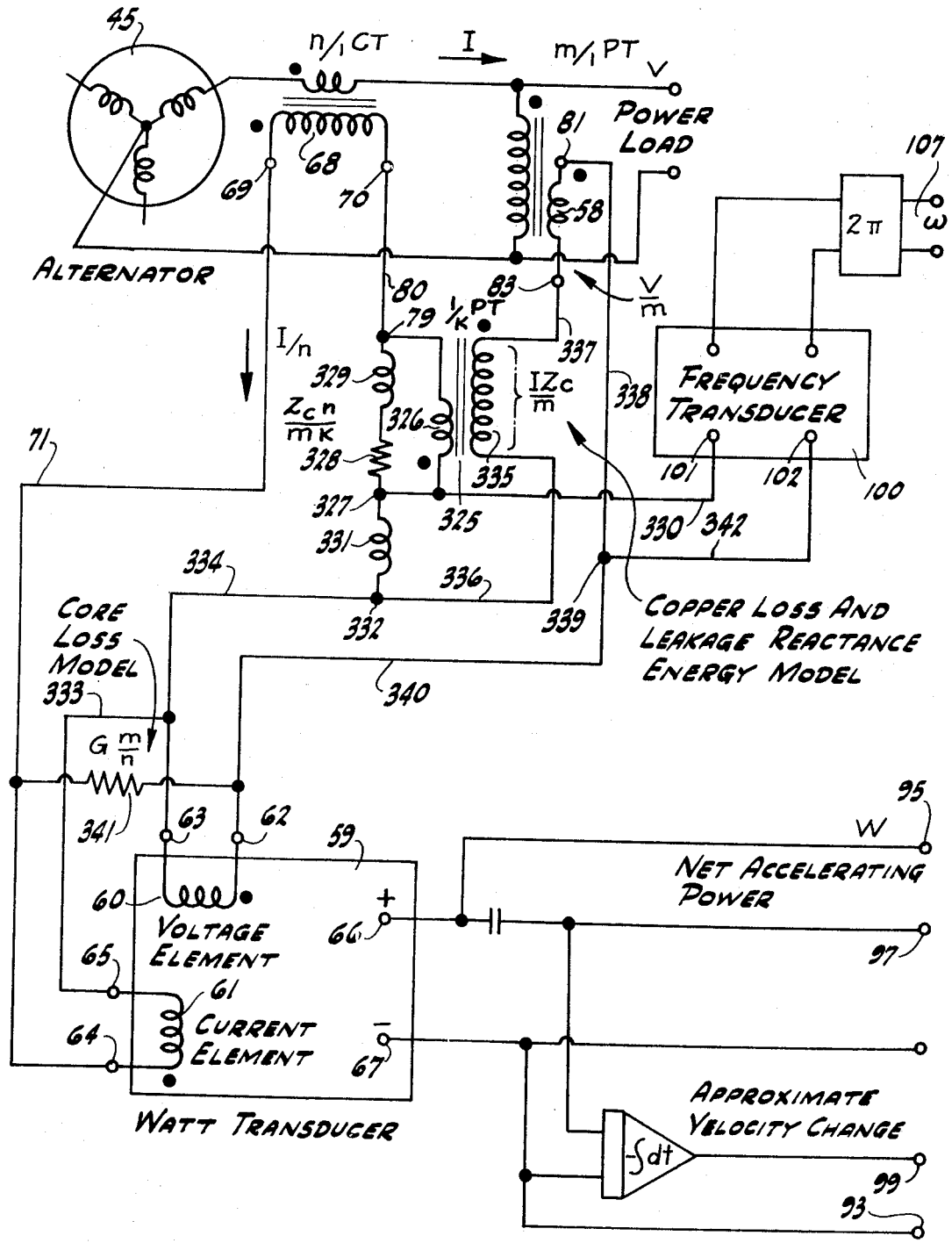
FIG. 8 is similar to FIG. 2 except that in FIG. 8 the reactance drop in the machine is coupled into a voltage circuit by an isolating transformer and the current representing any current losses is coupled into a current element by conductive connection instead of a transformer as shown in FIG. 2.

FIG. 8 is similar to FIG. 2 and illustrates an alternate embodiment of apparatus for providing a watt transducer whose output is accelerating power, and a frequency transducer from a single phase of the alternator whose output is the shaft velocity.

In FIG. 8 the reactance drop in the machine is coupled into the voltage circuit by an isolating transformer and the current representing the eddy current losses is coupled into the current element by conductive connections, instead of by a transformer as in FIG. 2. In FIG. 8 the watt transducer 59 with output terminals 66 and 67 and current element terminals 64 and 65, and voltage element terminals 62 and 63 is the same as in FIG. 2. In FIG. 8 the frequency transducer 100 with input terminals 101 and 102 and delivering an output across the two-wire circuit 107 proportional to the shaft speed is the same as in FIG. 2. In FIG. 8 one phase of the alternator has a current transformer with secondary winding 68 and one phase has a voltage transformer with secondary winding 58 as in FIG. 2. The dotted terminal 69 of secondary winding 68 of the current transformer is connected by conductor 71 to terminal 64. The undotted terminal 70 of winding 68 is connected by conductor 80 to terminal 79.

A potential transformer 325 is provided and has a primary to secondary turns ratio of 1:$k$. The primary winding 326 of potential transformer 325 is connected between terminals 79 and 327 with the dotted terminal connected to terminal 327. An impedance consisting of a series connection of a resistance 328 and reactance 329 is also connected between terminals 327 and 79. The value of this impedance is $Z_c$ $n/mk$. Conductor 330 is connected between terminal 327 and input terminal 101 of the frequency transducer 100. Reactance 331 is connected in series between junctions 327 and 332. The value of reactance 331 is $X_f = (X_q - X_c) n/m$. Current element terminal 65 is connected to voltage element terminal 63 by conductor 333. Voltage element terminal 63 is connected by a conductor 334 to terminal 332. Secondary winding 335 of potential transformer 325 has its undotted terminal connected by a conductor 336 to terminal 332. The dotted terminal end of secondary winding 335 is connected by conductor 337 to terminal 83 of secondary winding 58 of the potential transformer. Terminal 81 of the winding 58 is the dotted terminal and is connected by conductor 338 to terminal 339. Conductor 340 connects terminal 339 to terminal 62 of voltage element 60. Terminal 62 is the dotted terminal of voltage element 60 and terminal 64 is the dotted terminal of current element 61.

A conductance which models the core loss in the alternator 45 is the core loss model 341 which is connected in series between terminals 62 and 64 of the watt transducer 59. This conductance has the value $Gm/n$.

Junction 339 is connected to input terminal 102 of frequency transducer 100 by a conductor 342.

The connections in FIG. 8 are such that the potential across the voltage element 60 is the same in FIG. 8 as in FIG. 2 and the current through the current element 61 is the same in FIG. 8 as in FIG. 2. In FIG. 8 the current from the secondary of the current transformer flows through the reactance consisting of resistance 328 and reactance 329 and produces a voltage drop which may be smaller than the voltage drop necessary to correctly model the reactance drop within the alternator 45. The voltage drop across this series reactance is therefore stepped up by potential transformer 325 and appears across winding 335 with a magnitude correctly representing the copper loss and leakage reactance of the alternator.

In FIG. 8 the voltage across element 60 is the voltage representing the flux and its velocity in alternator 45 and this voltage is the voltage behind the eddy current losses in the iron, which produces a current from terminal 62 through core loss model 341 into terminal 64, out of terminal 65 through conductor 333 and back into terminal 63 of the voltage element 60 such that this current component through the current element 61 correctly represents the eddy current losses within the alternator. Core loss model 341 is connected conductively in FIG. 8, whereas in FIG. 2 the equivalent core loss model is provided by a potential transformer connected across the voltage element and providing a smaller potential across the core loss model and consequently the power losses in the core loss model are less in FIG. 2 than in FIG. 8.

It is within the scope of this invention to provide potential transformers both for the core loss model as in FIG. 2 and for the copper loss model as in FIG. 8 in such a manner that the power losses in the conductance 92 of FIG. 2 and the resistance 328 of FIG. 8 are minimized. These power losses are minimized when the value h in FIG. 2 is large and when the value $k$ in FIG. 8 is large.

FIG. 8 provides on terminal 95, which is connected to terminal 66, a voltage proportional to a measure of the power plus losses in the copper and iron. FIG. 8 provides on terminal 97 a measure of the changes in the power and therefore a measure of the accelerating power, and it provides on terminal 99 the approximate velocity changes obtained by integrating the signal proportional to accelerating power. On two-wire circuit 107 in FIG. 8 is provided a voltage proportional to the frequency of the voltage inside the alternator which has been modeled to be in-phase with the flux produced by the field structure of the alternator.

Figure 9:
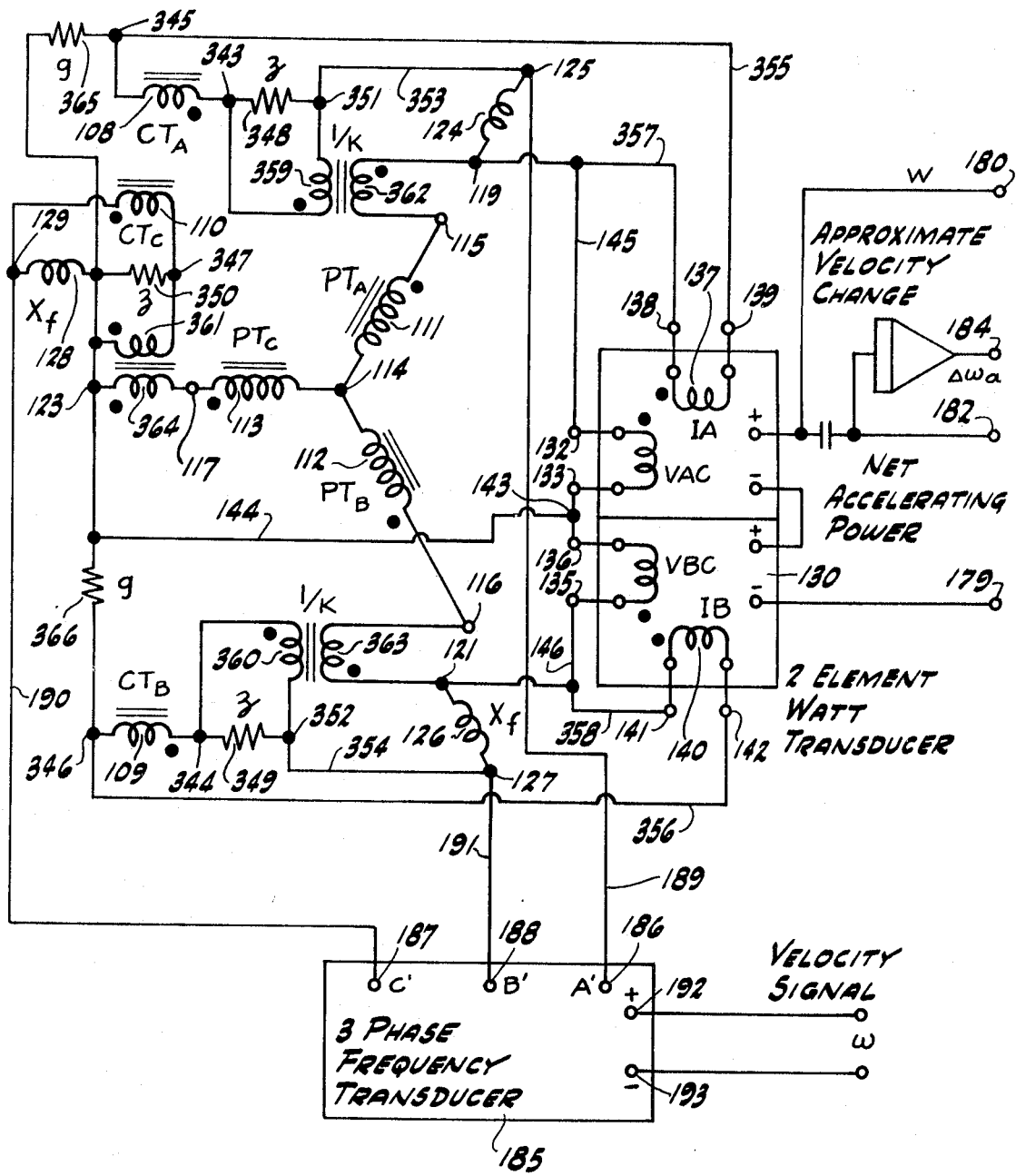
FIG. 9 is a three-phase embodiment of this invention, similar to FIG. 3 except that in FIG. 3 the voltage necessary to produce the current representing core loss is coupled by a potential transformer into the current circuit of the watt transducer and in FIG. 9 the voltage necessary to represent the copper losses of the alternator is coupled by a potential transformer into the voltage circuit of the watt transducer.

FIG. 9 is a three-phase embodiment of this invention similar to FIG. 3 except that in FIG. 3 the voltage necessary to produce the current representing core loss is coupled by a potential transformer into the current circuit of the watt transducer, and in FIG. 9 the voltage necessary to represent the copper losses of the alternator is coupled by a potential transformer into the voltage circuit of the watt transducer.

In FIG. 9 the two-element watt transducer 130 with voltage coil terminals 132, 133, 135, and 136, and current coil terminals 138, 139, 141, and 142 is the same as in FIG. 3. The frequency transducer 185 with input terminals 186, 187 and 188 and output terminals 192 and 193 is the same as in FIG. 3. In FIG. 9 the three-phase potential transformer secondaries 111, 112, and 113, with center tap terminal 114 and respective line terminals 115, 116, and 117 is the same as in FIG. 3.

In FIG. 9, current transformer secondary 110 has its dotted end connected to terminal 129. Between terminal 129 and terminal 123 is reactance 128 which has the same magnitude $X_f$ as the same numbered reactance in FIG. 3. Terminal 129 is connected to terminal 187 by conductor 190. Terminal 123 is connected to terminal 143 by conductor 144. Terminals 133 and 136 are also connected to terminal 143. Terminal 132 is connected by conductor 145 to terminal 119 and terminal 135 is connected by conductor 146 to terminal 121. Reactances 124 and 126 are connected respectively between terminals 119 and 125 and between terminals 121 and 127. Terminal 186 is connected to terminal 125 by conductor 189; and terminal 188 is connected to terminal 127 by conductor 191. The connections so far described are the same as in FIG. 3.

In FIG. 9 the current transformers for phases A, B, and C, respectively, have secondary windings 108, 109, and 110 with dotted terminals 343, 344, and 129, respectively. The undotted terminals of the current transformers for phase A, B, and C, whose secondary windings are numbered 108, 109, and 110 respectively, are terminals 345, 346, and 347, respectively. Impedances z, each equal to $Z_c n/mk$ are provided in FIG. 9 and indicated by reference numerals 348, 349, and 350 connected between terminals 343 and 351, 344 and 352, and 347 and 123, respectively. Terminal 351 is connected to terminal 125 by conductor 353. Terminal 352 is connected to terminal 127 by conductor 354. Terminal 345 is connected to terminal 139 by conductor 355. Terminal 346 is connected to terminal 142 by conductor 356. Terminal 138 is connected to junction 119 by conductor 357. Terminal 141 is connected to junction 121 by conductor 358.

The connections just described provide current flow from current transformer in Phase A out of terminal 343 through impedance 348, through conductor 353, through impedance 124, through conductor 357, into the dotted terminal of the current element 137 of the watt transducer 130, out of the undotted terminal 139 through conductor 355 and back into the undotted terminal 345 of the current transformer 108.

Similarly, the phase B current flows out of winding 109 into terminal 344, then to impedance 349, terminal 352, conductor 354, terminal 127, impedance 126, terminal 121, conductor 358, terminal 141, winding 140, terminal 142, conductor 356 and terminal 346. The phase C current flows out of winding 110 to terminal 129, impedance 128, terminal 123, impedance 350, terminal 347, back to winding 110.

The primary winding 359 of a potential transformer associated with phase A has its dotted terminal connected to terminal 343 and its undotted terminal to terminal 351. Primary winding 360 of another potential transformer has its dotted terminal connected to terminal 344 and its undotted terminal connected to terminal 352.

Primary winding 361 of a potential transformer associated with the C-phase has its dotted terminal connected to terminal 123 and its undotted terminal to terminal 347. These three primary windings have impressed across them voltages proportional to the Iz drops in impedances 348, 349, and 350. Secondary winding 362, which is magnetically coupled to winding 359 has its dotted terminal connected to terminal 119 and its undotted terminal to terminal 115. Secondary winding 363, which is magnetically coupled to primary winding 360, has its dotted terminal connected to terminal 121 and its undotted terminal connected to terminal 116. Secondary winding 364, which is magnetically coupled to primary winding 361, has its dotted terminal connected to terminal 123 and its undotted terminal connected to terminal 117. Each of these potential transformers has a step-up turns ratio of 1:k where k is larger than 1. These potential transformers couple the Iz drops into the potential circuits for the two-element watt transducer 130.

Two conductances $g = Gm/2n$ are provided and are generally indicated by reference numerals 365 and 366. Conductance 365 is connected between terminal 345 and terminal 123. Conductance 366 is connected between terminal 346 and terminal 123. These conductances deliver current to the current elements of the watt transducer 130 proportional to the iron losses in the alternator. The voltage on terminal 132 is presented to terminal 138 and the voltage on terminal 139 is essentially the same because the voltage drop in the current element 137 of the watt transducer 130 is negligible. This same potential therefore appears at terminal 345 and is impressed across the conductance 365. The current that flows through the conductance 365 is therefore proportional to the voltage which is proportional to the voltage generated in the iron of the alternator. This current component therefore passes through the current element between 138 and 139 and contributes an output to the watt transducer proportional to the core loss of the alternator.

Similarly, the current through conductance 366 is proportional to the voltage at terminal 135 and contributes a current component in coil IB and also contributes an output to the watt transducer proportional to the core loss of the alternator. The sum of these two output components does not have a significant ripple and correctly represents a balanced three-phase model for the core loss when the alternator voltages are balanced.

Therefore it can be seen that the output signals appearing in FIG. 9 are the same as the output signals in FIG. 3. The power delivered plus copper and core losses appears at terminal 180. The net changes in accelerating power appear at terminal 182 and the approximate velocity change signal appears at terminal 184. The velocity signal proportional to the frequency of the voltage generated behind leakage reactance appears between terminals 192 and 193.

It is within the scope of this invention to provide potential transformer coupling as in FIG. 3 to minimize the power losses in the model for the core loss of the alternator and also to provide potential transformer coupling as in FIG. 9 to minimize the power losses in the impedance z which models the copper loss of the alternator.

Figure 10:
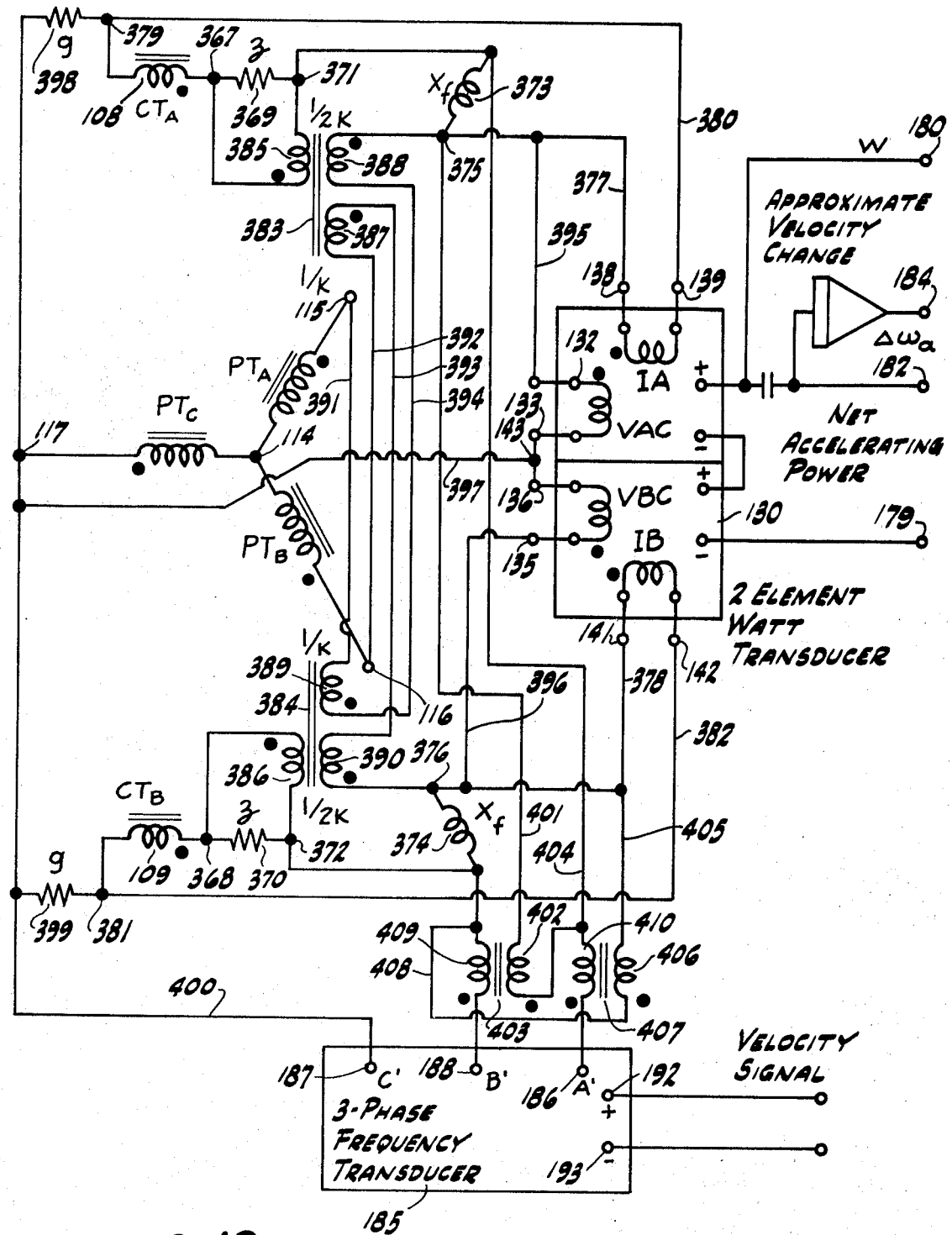
FIG. 10 is similar to FIG. 4 and illustrates an alternate embodiment thereof.

FIG. 10 is similar to FIG. 4 and computes the same signals as in FIG. 4. The embodiment shown in FIG. 10 is different from that in FIG. 4 in that the computation in FIG. 10 for the impedance drops in phase C is performed as equivalent voltage drops in phase A and B, whereas in FIG. 4 the computation for the impedance drops in phase C is introduced into phase C by means of transformer coupling from voltage drops measured by currents flowing in phases A and B. In FIG. 10 the three-phase frequency transducer 185 with input terminals 186, 187, and 188 is the same as in FIG. 4. In FIG. 10 the two-element watt transducer 130 with voltage input terminals 132, 133, 135 and 136 and current input terminals 138, 139, 141 and 142 is the same as in FIG. 4. In FIG. 10 the three-phase secondaries of the potential transformers in wye connection with the center tap 114 and with terminals 115, 116, and 117 is the same as in FIG. 4. In FIG. 10 the current transformer secondaries for phases A and B numbered 108 and 109, respectively, are the same as in FIG. 4.

In FIG. 10 the dotted terminals of the secondary windings 108 and 109 of the current transformers for phases A and B respectively are connected to terminals 367 and 368. Impedances z, 369, and 370 are connected between terminals 367 and 371 and between 368 and 372 respectively. The value of these impedances is $z = Z\ n/mk$. Reactances 373 and 374 are connected between terminals 371 and 375, and between terminals 372 and 376, respectively. The values of the reactances are $X_f = (X_q - X_c)\ n/m$. Terminal 375 is connected to terminal 138 by conductor 377 and terminal 376 is connected to terminal 141 by conductor 378. Terminal 139 is connected to terminal 379 by conductor 380 and terminal 142 is connected to a terminal 381 by conductor 382. The undotted end of the secondary windings 108 and 109 of the current transformers are connected respectively to terminals 379 and 381.

Two three-winding step-up potential transformers 383 and 384 are provided with primary windings 385 and 386 respectively. Winding 385 has its dotted terminal connected to terminal 367 and its undotted terminal to terminal 371. Winding 386 has its dotted terminal connected to terminal 368 and its undotted terminal connected to terminal 372. The secondary windings on transformer 383 are 387 and 388 and the secondary windings on transformer 384 are 389 and 390. The step-up ratio from 385 to 387 is a turns ratio and voltage ratio $1:k$. The step-up ratio from 385 to 388 and from 386 to 390 is $1:2k$. The undotted terminal of winding 389 is connected by conductor 391 to terminal 115. The undotted terminal of 387 is connected by conductor 392 to terminal 116. The undotted terminal of winding 390 is connected by conductor 393 to the dotted terminal of winding 387. The undotted terminal of winding 388 is connected by conductor 394 to the dotted terminal of winding 389. The dotted terminal of winding 388 is connected to terminal 375. The dotted terminal of winding 390 is connected to terminal 376. Terminal 132 is connected by conductor 395 to terminal 375. Terminal 135 is connected by conductor 396 to terminal 376. Terminals 133 and 136 are joined together at terminal 143 which is connected by conductor 397 to terminal 117. The connections just described provide the two phases necessary for the three-phase open delta input to the two-element watt transducer 130. Phase C voltage is provided from terminal 117 through conductor 397 to terminals 133 and 136. Phase A voltage is provided from terminal 115 plus the voltage induced in secondary winding 389 plus the voltage induced in secondary winding 388 to provide the voltage for terminal 132. In a similar manner, phase B has the voltage on terminal 116 plus the voltage in winding 387 plus the voltage of winding 390 to provide the voltage applied to terminal 135. The two sets of secondary windings provide a computation of the IR and leakage reactance drop in the alternator sufficient to provide a voltage for the watt transducer which includes the copper losses. The current for phase A originates in winding 108 and passes through impedance 369, impedance 373, the conductor 377 and into terminal 138, out through terminal 139, through conductor 380 to terminal 379 and back into winding 108.

The current provides the main power component of current for the watt transducer.

In addition, an additional current component is provided by conductances 398 and 399 which are connected between terminals 379 and 381 respectively to terminal 117. The current that flows through each of these conductances is proportional to the eddy current losses in the iron of the alternator. The value of each of these conductances is $g = Gm/2n$. Although the model is carefully designed for accurate eddy current losses representation under variable voltage, it is part of this invention to include in the conductances $g$ an additional amount of conductance sufficient to represent approximately the changes in the hysteresis losses within the alternator in addition to the changes in eddy current losses. The output of the two-element watt transducer 130 therefore represents the power flowing to the load plus the changes in copper and core losses in the alternator. This output appears as a total wattage signal on terminal 180 and as a change in wattage signal proportional to the net accelerating power on terminal 182. After low pass filtering the output appears as a change in the velocity signal which appears on terminal 184.

In addition, in FIG. 10 there is shown a three-phase frequency transducer 185. Terminal 187 of this transducer is connected by conductor 400 to terminal 117.

Conductor 401 connects terminal 375 to the undotted terminal of primary winding 402 of potential transformer 403. Conductor 404 connects terminal 371 to the dotted terminal of primary winding 402. Conductor 405 connects terminal 376 to the undotted terminal of primary 406 of potential transformer 407. Conductor 408 connects the dotted terminal of primary winding 406 to terminal 372.

The secondary winding 409 of transformer 403 has its undotted terminal connected to terminal 372 and its dotted terminal connected to terminal 188. The secondary winding 410 of transformer 407 has its undotted terminal connected through conductor 404 to terminal 371 and its dotted terminal connected to terminal 186. By virtue of the reactances 373 and 374 and transformers 403 and 407, there is provided at the input to the three-phase frequency transducer 185 a three-phase voltage proportional to the voltage behind quadrature axis reactance in alternator 45. The output of transducer 185 appearing between terminals 192 and 193 is therefore a voltage proportional to the velocity of the shaft of the alternator 45.

Figure 11:
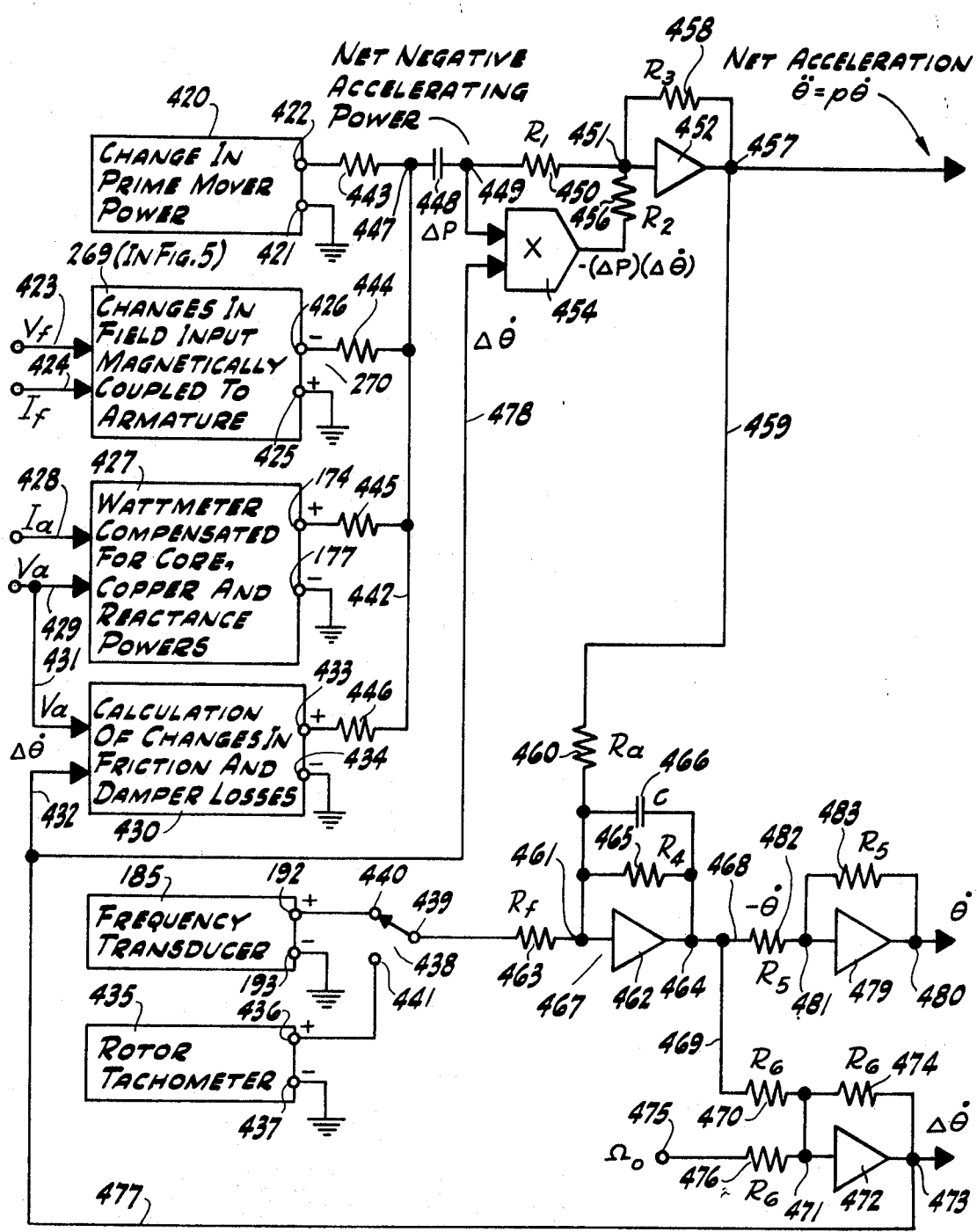
FIG. 11 is a block diagram similar to FIG. 6 for low noise velocity computation.

FIG. 11 is a block diagram and wiring diagram for the computation of acceleration and velocity with optimum noise rejection for supplementary excitation field control. In FIG. 11, block 420 calculates changes in prime mover shaft output power from either computed velocity as in FIG. 1 or from turbine sensors. Output terminal 421 is connected to a common ground and output terminal 422 has a potential to ground which increases more negatively as the turbine shaft power increases. Block 269 in FIG. 11 is similar to the same numbered block in FIG. 5. It receives information from field voltage and field current sensors on alternator 45 marked circuits 423 and 424 respectively. It computes the power coupled into the alternator armature circuits, one phase of which is marked 50 in FIG. 2. The output of 269 on circuit 270 has terminal 425 connected to the common ground and terminal 426 goes more negative as the dynamic transformer power flow from field to armature increases.

Block 427 is the composite of the circuits shown in either FIG. 3, 4, 9 or 10. Circuit 428 represents the current transformers in at least two phases of the alternator output. Circuit 429 represents the potential transformers in the three phases of the alternator output. These two circuits deliver information to block 427. The output of block 427 appears as a voltage between terminals 174 and 177 which is proportional to the alternator a-c power output to a load, plus the power lost in core and copper losses, plus the increase in power stored in the leakage reactance during current changes. When the alternator output power increases, terminal 174 increases positively in potential with respect to terminal 177, which latter is connected to the common ground.

Block 430 calculates changes in friction and damper losses similar to the circuits in FIG. 5 numbered 181 through 184, 228, and 246 through 266 inclusive. Block 430 receives armature voltage information from circuit 431 connected to circuit 429 and change of velocity information from circuit 432. The output of block 430 appears as a potential between terminals 433 and 434. Also, 434 is connected to the common ground. When friction and damper losses increase, terminal 433 becomes more positive in potential.

Block 185 is the frequency transducer shown in FIGS. 3, 4, 9 or 10. Its output appears between terminals 192 and 193, the latter being connected to the common ground. When the velocity increases, terminal 192 becomes more positive in potential.

Also shown in FIG. 11 is a rotor tachometer 435 with output terminals 436 and 437, the latter being connected to the common ground. Tachometer 435 is an electrical generator producing on terminal 436 an average voltage proportional to the speed of the rotor of generator 45 and polarized so that an increase of speed causes terminal 436 to become more positive. Tachometer 435 can be a conventional type well known in the art, as for example, a frequency meter excited by light pulses from alternate reflecting bands on the alternator rotor, or a frequency meter excited by a magnetic pickup adjacent to the teeth of a gear driven by the alternator rotor, or a d-c generator mechanically coupled to the alternator shaft, or an a-c generator mechanically coupled to the alternator shaft. Tachometer 435 may also be a type disclosed in a copending application.

Switch 438 in FIG. 11 is a single pole double throw switch with blade terminal 439, upper input terminal 440, and lower input terminal 441, with the blade shown connecting 440 to 439, and in the position not shown the blade would connect 441 to 439. Terminal 440 is electrically connected to terminal 192 and terminal 441 is electrically connected to terminal 436.

Terminals 422, 426, 174 and 433, respectively are each electrically connected to bus 442 by resistors 443, 444, 445, and 446, respectively. Bus 442 terminates at terminal 447 which is one connection to the capacitor 448. The other terminal 449 of capacitor 448 is connected by resistor 450 to the input terminal 451 of the operational amplifier 452. Conductor 453 provides one input to the operational multiplier 454 from terminal 449. The output of multiplier 454 on circuit 455 is connected through resistor 456 to terminal 451.

The output of amplifier 452 appears at terminal 457 and is connected through feedback resistor 458 back to the input terminal 451. Conductor 459 and resistor 460 form a series circuit connecting terminal 457 to input terminal 461 of operational amplifier 462. Resistor 463 is connected between terminals 439 and 461. Feedback resistor 465 is connected between the output terminal 464 of amplifier 462 and input terminal 461. Feedback capacitor 466 is connected between terminals 464 and 461.

Conductor 469 and resistor 470 form a series circuit connecting terminal 464 to the input terminal 471 of operational amplifier 472 whose output terminal is 473. Feedback resistor 474 is connected between 473 and 471. Terminal 475 has provided an adjustable fixed voltage not shown of magnitude $\Omega_0$. Resistor 476 connects terminal 475 to terminal 471.

Circuit 477 carries the potential on terminal 473 to circuit 432 and to circuit 478 which is another input to operational multiplier 454.

Operational amplifier 479 with output on terminal 480 receives its input on terminal 481 from terminal 464 through conductor 468 and resistor 482 and also receives a feedback signal on 481 from terminal 480 through the feedback resistor 483.

In FIG. 11, the ohmic values of the resistors is given by:

| Resistor | Value in Ohms |
|---|---|
| 450 | $R_1$ |
| 456 | $R_2$ |
| 458 | $R_3$ |
| 460 | $R_a$ |
| 463 | $R_f$ |
| 465 | $R_4$ |
| 470 | $R_6$ |
| 474 | $R_6$ |
| 476 | $R_6$ |
| 482 | $R_5$ |
| 483 | $R_5$ |

Capacitor 466 has a value of C farads.

In FIG. 11, the potential at terminal 422 is proportional to the negative prime mover power. The potential at terminal 426 is proportional to the negative power coupled by transformer action from the field circuit into the armature circuit. The potential at terminal 174 is proportional to the alternator a-c power output plus copper and core losses and dynamic increases in power flow into the leakage reactance. The potential on terminal 433 is proportional to the friction and damper looses. The connection of resistors 443, 444, 445, and 446 to the bus 442 forms a resistive adder such that the potential on bus 442 and terminal 447 is proportional to the negative of the power flowing into the rotor inertia and causing acceleration.

The resistors 443, 444, 445, and 446 are so chosen that each calibration constant is the same in volts change at 447 for a megawatt power flow change in 420, 269, 427, and 430, respectively. Since the total average volts per average megawatts is not necessarily the same as the dynamic characteristic of instantaneous partial derivative of volts with respect to megawatts, the zero acceleration state will not correspond to zero average volts at 447.

To remove the average value of voltage at 447, the blocking capacitor 448 is provided so that the potential at terminal 449 is zero when the acceleration is zero. For illustrative purposes, the signal at 449 is 1 volt per megawatt.

Amplifier 452 with feedback resistor 458 and input resistor 450 is an inverting scale changing amplifier with gain of $-R_3/R_1$ providing at terminal 457 a signal voltage equal to the rotor acceleration $\ddot\theta$ in radians per second squared. Acceleration is approximately equal to $(\Delta P) J \Omega_0$, where $\Omega_0$ is the nominal synchronous angular velocity or angular frequency in radians per second, $(\Delta P)$ is megawatts, and $J$ is the inertia constant in seconds-cubed megawatts per radians squared. The resistance ratio is $R_1/R_3 = J\Omega_0$ Multiplier 454 receives the signal $(\Delta P)$ on circuit 453 and also receives the signal $(\Delta\dot\theta)$ change in angular velocity on circuit 478. The signal delivered on circuit 455 is $-(\Delta P)(\Delta\dot\theta)$ in units of 1 volt for 1 megawatt radian per second. The gain from 455 to 457 is $-R_3/R_2$, which is designed to be equal in magnitude to $1/J\Omega_0^2$.

$$R_2/R_3 = \Omega_0^2 J$$

The signal passed by $R_2$ is equivalent to the signal on circuit 296 in FIG. 6. The elements 449 through 458 inclusive calculate negative power divided by velocity times inertia, which is torque divided by inertia, which is acceleration. Specifically, the signal on 457 contains a noise component $N_a$ plus $$-\frac{(\Delta P)}{J\Omega_0}\left(1-\frac{\Delta\dot\theta}{\Omega_0}\right)$$

which latter is approximately equal to $$\ddot\theta = \rho\dot\theta = -\frac{(\Delta P)}{J\Omega_0\left(1+\frac{\Delta\dot\theta}{\Omega_0}\right)} = -\frac{(\Delta P)}{J(\Omega_0+\Delta\dot\theta)}$$

where $\rho$ stands for $d/dt$.

The elements 459 through 466 comprise a low pass amplifier and adder 467 which performs several functions. The input signal $\ddot\theta$ from 457 is approximately integrated to produce $-\dot\theta$ approximately at output terminal 464. This operation is very accurate for the high frequencies in $\ddot\theta$ and $\dot\theta$. There is also very low noise in $\ddot\theta$ and the low pass filtering action of the approximate integration operating on the noise produces an excellent noise-free signal at terminal 464.

The second input signal to 467 from 439 is the measured rotor velocity in units of $f$ volts per radian per second. When the blade of switch 438 is in the upper position as shown in FIG. 11, this velocity signal is derived from the frequency transducer 185. When the blade of switch 438 is in the lower position, a position not shown in FIG. 11, a d-c voltage from the rotor tachometer 435 is conducted from terminal 436 to terminal 441 and to terminal 439. In either case, there will be ripple and noise voltages superimposed on the signal voltage at 439, so that it is noise $N_f$ plus $f\dot\theta$. Resistor 463 and low pass amplifier 467 invert the polarity of the signal at 439 to produce an additive component of the signal at 464 which is the negative velocity with high frequency noise and ripple significantly reduced.

The gain from 457 to 464 is $$\frac{-R_4}{R_a(1+\rho T)}$$

where $T$ is $R_4 C$ and $\rho$ is $d/dt$.

The gain from 439 to 464 is $$\frac{-R_4}{R_f(1+\rho T)}$$

The voltage at 464 is $$V_{464} = -\frac{R_4}{(1+\rho T)}\left(\frac{N_f + f\dot\theta}{R_f} + \frac{N_a + \rho\dot\theta}{R_a}\right)$$

$$V_{464} = -\frac{R_4}{(1+\rho T)}\left(\frac{f}{R_f}\right)\left(1+\frac{R_f}{fR_a}\rho\right)\dot\theta - \frac{R_4}{(1+\rho T)}\left(\frac{N_f}{R_f}+\frac{N_a}{R_a}\right)$$

A preferred embodiment has the design values
$$R_f = fR_4$$
and
$$R_f = TfR_a$$
or
$$R_a = R_4/T$$

In this case, the voltage at 464 is $$V_{464} = -\dot\theta - \frac{TN_a + N_f/f}{(1+\rho T)}$$

The time constant $T$ can be adjusted to minimize the resultant noise voltage $(TN_a+N_f/f)/(1+\rho T)$. Usually $N_f$ is large and $N_a$ is small, so that a very large time constant $T$ filters out $N_f$. When $T$ is very large the resultant noise is approximately $$\left(\frac{N_a}{\rho}\right) + \left(\frac{N_f}{\rho fT}\right)$$

If the noise spectral distributions are the same, so that the integrals are the same, then the two noise components are equal when $T = N_f/fN_a$.

This value is near to the optimum value which minimizes the resultant noise.

Following this adjustment, it is hereafter assumed that the voltage at 464 is equal to $-\dot\theta$ and the noise can be neglected.

Elements 479 through 483 comprise a unity-gain inverting amplifier receiving the voltage from 464 by conductor 468 and delivering on terminal 480 the voltage $\dot\theta$ equal to the rotor velocity in radians per second.

Elements 469 through 476 comprise another unity-gain inverting amplifier which also acts as a summer. The voltage on 464 is conducted by 469 to the input terminal 471. In addition, a fixed d-c voltage equal to the nominal synchronous angular velocity $\Omega_o$, which is approximately equal to the average velocity of the system is provided at terminal 475 and is conducted by 476 to the input terminal 471. The input to the amplifier therefore receives the difference $(\Omega_o - \dot\theta)$ and the output terminal 473 therefore has the voltage $\Delta\dot\theta = (\dot\theta - \Omega_o)$.

This voltage $\Delta\dot\theta$ is supplied by conductors 477 and 432 to one input of block 430 for the calculation of changes in friction loss.

This voltage $\Delta\dot\theta$ is supplied by conductors 477 and 478 to one input of multiplier 454 for the calculation of the change in torque due to change in velocity on circuit 455.

From the foregoing it is apparent that the configuration of FIG. 11 provides a new and unique method and apparatus for the measurement of the acceleration of a synchronous alternator with improved signal-to-noise power ratio. It also provides a new and unique method for the measurement of the velocity of a synchronous alternator with improved signal-to-noise power ratio. The superior performance of this unique invention is due to the use of a time constant instead of an integrator to calculate velocity from acceleration and eliminate integrator drift, and due to the use of very low bandwidth to discard the objectionable noise from the frequency transducer, and due to the excellent noise-free properties of a velocity signal computed from acceleration, for all nonzero transient frequencies, and due to the combination of steady-state velocity signals from a frequency transducer with transient velocity signals from integrated acceleration.

FIG. 12 shows the control use of the signals from FIG. 11. In FIG. 12, terminals 457 and 473 are the same as in FIG. 11. Alternator 45 and circuit elements 46, 47, 48, 49, 50, 51, 53, 56, 57, 58, 81 and 83 are the same as in FIG. 2.

In FIG. 12, amplifier 500 has an input terminal 501 to which is connected bus 502. Resistors 503 and 504 are connected in series from terminal 457 to bus 502 and terminal 501. Diode 505 is connected in parallel with resistor 503 and polarized to short-circuit resistor 503 when the acceleration $\ddot\theta$ is positive. Resistors 506 and 507 are connected in series from terminal 473 to bus 502 and terminal 501. Diode 508 is connected in parallel with resistor 506 and polarized to short-circuit resistor 506 when the velocity deviation $\Delta\dot\theta$ is negative.

The output of amplifier 500 is a voltage on terminal 509. Feedback resistor 510 is connected from terminal 509 to bus 502 and terminal 501. Amplifier 500 may be multiple stages, as is well known in the art, for example, an FET input operational amplifier followed by transistor or SCR amplifiers. It may also contain filters and phase-lead compensating networks. A dynamoelectric amplifier stage 511 is also provided in FIG. 12, consisting of a field 512 connected from terminal 509 to the common ground, and a power armature with output terminals 513 and 514. Terminal 513 is connected to one terminal 515 of the main alternator d-c field supply. Terminal 514 is connected by conductor 516 to one terminal 517 of the alternator field 518. Resistor 520 is connected between the other terminal 519 of the alternator field 518 and terminal 521. The other terminal 522 of the main alternator d-c field supply is connected by conductor 523 to terminal 521.

A field voltage sensor 524 has an input circuit connected between terminals 514 and 522. Its output on circuit 525 is a voltage proportional to $V_f$ and is connected to circuit 423 in FIG. 11.

A field current sensor 526 has an input circuit connected between terminals 519 and 521 and its output on circuit 527 is a voltage proportional to $I_f$ and is connected to circuit 424 in FIG. 11. Circuit 527 provides the input to the current feedback control 528 whose output on terminal 529 is connected by resistor 530 to bus 502 and terminal 501.

A voltage regulator system 531 has an output on terminal 532 which is connected by resistor 533 to bus 502 and terminal 501. Input terminals 534 and 535 of the voltage regulator system 531 are connected respectively to terminal 81 and through diode 536 to terminal 83. Resistor 537 is connected between terminals 534 and 535.

Other controls 538 are provided with resistor 539 connecting the output to bus 502.

The steady-state operation of FIG. 12 is basically as follows: A d-c current flows from 522 through 523, 520, 519 mainfield 518, 516, 514, 513 and into 515. The flux produced by this current in generator 45 induces an a-c voltage in armature winding 50 which appears across the secondary 58 of the potential transformer. This voltage is rectified by 536 and its rectified value appears across resistor 537 and the input to the voltage regulator system 531. Raise or lower voltage commands are generated at terminal 532 and are fed into amplifier 500 by resistor 533 and bus 502.

When the generated voltage is too low, terminal 532 increases in potential, and terminals 509 and 514 go negative. Amplifier 500 changes the current in field 512 in such a direction that the potential from 513 to 514 becomes more positive and the potential from 519 to 517 becomes more positive and the field current through 518 increases.

The voltage regulator system 531 and amplifiers 500 and 511 can be any conventional types commercially available. Amplifier 511 need not be dynamoelectric, but can be a fast-acting silicon controlled rectifier type or a brushless system with rotor-mounted rectifiers.

During transients, $\ddot\theta$ and $\Delta\dot\theta$ are nonzero. When the acceleration is positive, the acceleration signal passes into amplifier 500 with high gain, determined by the conductance of resistor 504. Terminal 509 is more negative and terminal 514 is more negative than 513. The potential from 519 to 517 increases a large amount, the rate of increase of field current is a large amount, and the a-c power output of generator 45 subsequently increases, decreasing the acceleration.

When the acceleration is negative, the signal passes into amplifier 500 with low gain, determined by the low conductance of resistors 503 and 504 in series. The rate of decrease of field current in 518 is a small amount. The a-c power subsequently decreases and the acceleration goes more positive.

When the velocity deviation is positive, the signal passes into amplifier 500 with low gain, determined by the low conductance of resistors 506 and 507 in series. The rate of increase of field current in field 518 is a small amount, compared to positive acceleration signals. Increased field current yields increased a-c power flow, more negative acceleration, which integrates to more negative velocity.

When the velocity deviation is negative, the signal passes into amplifier 500 with high gain, determined by the high conductance of resistor 507. Terminal 509 is highly positive. Terminal 514 is highly positive with respect to terminal 513, and the potential of terminal 519 with respect to terminal 517 is very low or zero or negative depending upon minimum field voltage limitations built into the voltage regulator system and not shown in FIG. 12. The rate of decrease of current in field 518 is very large compared to that produced by negative accelerations. Low field current yields more positive acceleration which integrates to more positive velocity. These controls override the voltage regulator system during transients and provide basically an optimal bang-bang control of large acceleration negative feedback when the acceleration is positive, and large velocity negative feedback when the velocity is negative. Resistors 503 and 506 provide a small component of feedback control which is linear negative feedback effective for very small disturbances.

Amplifier 500 contains phase lead networks to reduce the apparent time constants of field 512 and of field 518. As is well-known to those skilled in the art, there can be a phase lag approaching 90° of the current in 512 with respect to the voltage at 509. Either current feedback or derivative signals from differentiating networks in 500 can be used to reduce the apparent time constant of 512 and to reduce the phase lag of the current at the transient frequencies for which the control is useful.

Similarly, the time constant of field 518 produces on undesirable phase lag, and networks within 500 can partially compensate for this. The effect of these compensations is to make the a-c power out proportional to measured θ instead of acceleration lagged by two time constants.

In FIG. 12, the current sensor 526 measures the voltage proportional to the field current through resistor 520. Increased field current causes an increase in the signal on 527 and a decrease in the potential at terminal 529. This is negative current feedback. With high gain in 528, this current causes the signals passed by resistors 504 and 507 to essentially control field current instead of voltage. Networks may also be provided in 528 to stabilize the current negative feedback loop.

Block 538 in FIG. 12 can introduce control signals through resistor 539. This is provided in accordance with U.S. Pat. No. 3,388,305, in which a torque angle sensor also provides excitation control signals.

It can be seen from the foregoing that there has been provided an apparatus and a method for generating signals proportional to shaft acceleration, proportional to shaft velocity, and proportional to changes in shaft velocity, of an alternator by computations dependent upon measurements responsive to the terminal voltage and terminal current of the alternator. In particular these shaft acceleration and velocity signals are obtained without directly connecting to the shaft any device other than the conventional excitation and armature windings of the alternator.

I claim:

1. Apparatus for generating signals related to the characteristics of the shaft of an alternator having an armature winding comprising:
   a. a watt transducer having a current input, a voltage input and power signals output;
   b. means for generating an armature current proportional to the current flow in the alternator armature winding and means for applying said armature current to said current input;
   c. means for generating an armature voltage proportional to the voltage across the armature winding of the alternator and means for applying said armature voltage to said voltage input;
   d. means responsive to said armature current for generating a copper loss signal representative of the resistance drop and leakage reactance drop in the alternator and means for applying said copper loss signal to said voltage input;
   e. means responsive to said armature voltage and said copper loss signal for generating a core loss signal representative of the alternator core loss and means for applying said core loss signal to said current input; and
   f. means responsive to said output of said watt transducer for generating an accelerating power change signal.

2. Apparatus as described in claim 1 including means responsive to said accelerating power change signal for generating an approximate velocity change signal.

3. Apparatus as described in claim 2 wherein said means responsive to said accelerating power change signal for generating an approximate velocity change signal comprises integration means.

4. Apparatus as described in claim 2 wherein said means responsive to said accelerating power change signal for generating an approximate velocity change signal comprises low pass filter means.

5. Apparatus as described in claim 2 wherein said means responsive to said output of said watt transducer for generating an accelerating power change signal comprises a capacitor.

6. Apparatus as described in claim 2 including means for summing said armature voltage and said copper loss signal to form a first sum signal, and including a frequency transducer having an input and an output, said sum signal applied to said frequency transducer input, and said frequency transducer output generating a velocity signal representative of the angular radian frequency of the alternator shaft.

7. Apparatus as described in claim 6 including means responsive to said approximate velocity change signal and said velocity signal for generating a compensated velocity signal.

8. Apparatus as described in claim 2 including:
   a. means for generating a first squared signal proportional to the square of the magnitude of said armature voltage;
   b. means for generating a second squared signal proportional to the square of said approximate velocity change signal;
   c. multiplying means for multiplying together said first squared signal and said second squared signal to form a multiplied output;
   d. means responsive to said multiplied output for generating a damper loss signal representative of damper winding loss in the alternator; and
   e. means for adding said damper loss signal to said accelerating power change signal to form a first corrected accelerating power change signal.

9. Apparatus as described in claim 8 including:
   a. means for generating a third squared signal proportional to the square of the magnitude of the alternator synchronous radian frequency;
   b. means for generating a computed synchronous velocity signal proportional to the synchronous velocity of the alternator;
   c. summing means for summing said second squared signal, said third squared signal and said computed synchronous velocity signal to form a second sum signal;
   d. means responsive to said second sum signal for generating a friction and windage loss signal representative of friction and windage losses of the alternator; and
   e. means for adding said friction and windage loss signal to said first corrected accelerating power change signal to form a second corrected accelerating power change signal.

10. Apparatus as described in claim 9 including a frequency transducer having an input and output, means for applying said copper loss signal to said frequency transducer input, said frequency transducer output generating a velocity signal proportional to the angular radian frequency of the alternator shaft.

11. Apparatus as described in claim 10 including means responsive to said second corrected accelerating power change signal for generating a corrected approximate velocity change signal.

12. Apparatus as described in claim 11 including means responsive to said corrected approximate velocity change signal and said velocity signal for generating a compensated velocity signal.

13. A method for measuring characteristics of the shaft of an alternator comprising the steps of
 a. generating a first signal responsive to power flow out of the alternator;
 b. generating a second signal responsive to the copper loss within the alternator;
 c. combining said first and second signals to produce a third signal proportional to changes in net accelerating power;
 d. deriving from said third signal a fourth signal proportional to approximate changes in shaft velocity which is responsive to the low frequency components in said first and second signals;
 e. generating a fifth signal proportional to the low frequency components of shaft velocity; and
 f. combining said fourth signal and said fifth signal to form a compensated velocity signal.

14. The method of claim 13 including the steps of generating a sixth signal representative of damper losses in the alternator and a seventh signal representative of friction and windage losses in the alternator, and combining said sixth and seventh signals with said first and second signals to produce said third signal.

15. A method for measuring the acceleration of an alternator comprising the steps of:
 a. generating a first signal proportional to the armature terminal voltage of the alternator;
 b. generating a second signal proportional to the armature terminal line current of the alternator;
 c. generating a third signal responsive to a power loss within the alternator;
 d. generating a fourth signal by adding said third signal to one of the first and second signals;
 e. generating a fifth signal by multiplying said fourth signal by the other one of said first and second signals, and
 f. deriving from said fifth signal by high pass filter means a sixth signal proportional to changes in net accelerating power.

16. The method of claim 15 including the step of generating a voltage proportional to the voltage drop within the alternator armature to produce said third signal, and wherein said one of the first and second signals is the said first signal.

17. The method of claim 15 including the step of generating a current proportional to the eddy currents in the magnetic iron of the alternator armature to produce said third signal, and wherein said one of the first and second signals is the said second signal.

18. The method of claim 15 including the steps of generating a seventh signal representative of the losses in the alternator damper windings, and combining said fifth and said seventh signals to produce said sixth signal.

19. The method of claim 15 including the steps of generating a seventh signal representative of the changes in the alternator field input magnetically coupled to the alternator armature, and combining said fifth and said seventh signals to produce said sixth signal.

20. The method of claim 15 including the steps of generating a seventh signal representative of the changes in alternator frictional losses, and combining said fifth and said seventh signals to produce said sixth signal.

21. The method of claim 15 including the steps of generating a seventh signal proportional to the changes in alternator prime mover power, and combining said fifth signal and said seventh signal to produce said sixth signal.

22. The method of claim 15 including the steps of generating a seventh signal responsive to only one polarity of said sixth signal, generating an eighth signal by combining said sixth and seventh signals, and exciting the field of said alternator responsive to said eighth signal.

23. The method of claim 19 including the steps of generating an eighth signal responsive to only one polarity of said sixth signal, combining said eighth and said sixth signals to produce a ninth signal, and controlling the said alternator field input with said ninth signal.

24. A method for measuring the acceleration of an alternator comprising the steps of:
 a. generating a first signal proportional to the a-c power flow out of the alternator;
 b. generating a second signal proportional to a second power flow component;
 c. combining a said and second signals to produce a third signal;
 d. a deriving from said third signal by high pass filter means a fourth signal proportional to changes in net accelatating power;
 e. generating a fifth signal proportional to the alternator excitation field input power flow; and
 f. deriving said second signal from said fifth signal by high pass filter means.

25. A method for measuring the acceleration of an alternator comprising the steps of:
 a. generating a first signal proportional to the a-c power flow and out of the alternator;
 b. generating a second signal proportional to a second power flow component;
 c. combining said first and second signals to produce a third signal;
 d. deriving from said third signal by high pass filter means as fourth signal proportional to changes in net accelerating power;
 e. generating a fifth signal proportional to alternator prime mover power flow; and
 f. deriving said second signal from said fifth signal by high pass filter means.

26. A method for measuring the acceleration of an alternator comprising the steps of:
 a. generating a first signal proportional to the a-c power flow out of the alternator;
 b. generating a second signal proportional to a second power flow component;
 c. combining said first and second signals to produce a third signal;
 d. deriving from said third signal by high pass filter means of fourth signal proportional to changes in net accelerating power;
 e. generating a fifth signal representative of the alternator frictional losses; and
 f. deriving said second signal from said fifth signal.

27. A method for measuring the acceleration of an alternator comprising the steps of:
 a. generating a first signal proportional to the a-c power flow out of the alternator;
 b. generating a second signal representative of the losses in the alternator damper windings mounted on the field structure;
 c. combining said first and second signals to produce a third signal; and
 d. deriving from said third signal by high pass filter means a fourth signal proportional to changes in net accelerating power.

28. A method for measuring the acceleration of an alternator comprising the step of:
 a. a generating a first signal proportional to the a-c power flow out of the alternator;

b. generating a second signal proportional to a second power flow component;

c. combining said first and second signals to produce a third signal;

d. deriving from said third signal by high pass filter means of fourth signal proportional to changes in net accelerating power:

e. generating a fifth signal responsive to only one polarity of said fourth signal;

f. combining said fourth and said fifth signals to produce a sixth signal; and g. exciting the alternator field responsive to said sixth signal.

29. The method of claim 24 including the steps of generating a sixth signal from one polarity only of said fourth signal, combining said fourth and said sixth signals to produce a seventh signal, and controlling the alternator excitation field input by said seventh signal.

30. The method of claim 27 including the steps of generating a fifth signal from one polarity only of said fourth signal, combining said fifth and said fourth signals to make a sixth signal, and controlling the alternator excitation field input by said sixth signal.

31. A method for measuring the acceleration and velocity of an alternator comprising the steps of a. generating a first signal proportional to the a-c power flow out of the alternator;

b. generating a second signal which is proportional to the net accelerating power by response to changes in said first signal;

c. generating a third signal responsive to at least said second signal; and d. generating a fourth signal responsive to low-pass filtering of said third signal.

32. The method of claim 31 including the steps of generating a fifth signal responsive to changes in said fourth signal, multiplying said second and fifth signals to produce a sixth signal, and combining said second and sixth signals to produce said third signal.

33. The method of claim 31 including the steps of generating a fifth signal responsive to the angular velocity of the rotor of said alternator, and generating said third signal by combining said second and said fifth signals.

34. The method of claim 31 including the steps of generating a fifth signal responsive to the frequency of the generated voltage in the armature of said alternator, and generating said third signal by combining said second and said fifth signals.

35. The method of claim 31 including the steps of generating a fifth signal responsive to one polarity only of said second signal, generating a sixth signal responsive to one polarity only of said fourth signal, combining said second, fourth, fifth, and sixth signals to produce a seventh signal, and exciting the alternator excitation field input responsive to said seventh signal.

36. The method of claim 35 including the steps of generating an eighth signal proportional to the current in said excitation field and wherein said seventh signal is also responsive to said eighth signal.

37. The method of claim 35 including the steps of generating an eighth signal responsive to the angular velocity of the rotor of said alternator, and combining said eighth signal and said second signal to produce said third signal.

38. The method of claim 35 including the steps of generating an eighth signal proportional to the armature terminal voltage of said alternator, and wherein said seventh signal is also responsive to said eighth signal.

39. The method of claim 35 including the steps of generating an eighth signal by approximate integration of said fourth signal, and wherein said seventh signal is also responsive to said eighth signal.

40. A method for measuring the velocity and acceleration of an alternator comprising the steps of a. generating a first signal proportional to the a-c power flow from the armature of the alternator;

b. generating a second signal proportional to changes in said first signal which is thereby responsive to said acceleration;

c. deriving a third signal responsive to the said velocity of said alternator by low pass filtering of said second signal; and d. generating an excitation signal responsive to both said second signal and said third signal for exciting the field of said alternator.

41. A method for measuring the velocity and acceleration of an alternator comprising the steps of:

a. generating a first signal proportional to the a-c power flow from the armature of the alternator;

b. generating a second signal proportional to the changes in said first signal;

c. generating an excitation signal responsive to said second signal for exciting the field of said alternator;

d. generating a third signal responsive to the angular velocity of the rotor of said alternator;

e. combining said second signal and said third signal to produce a fourth signal;

f. generating a fifth signal by low pass filtering of said fourth signal; and g. wherein said excitation signal is also responsive to said fifth signal.

42. A method for measuring the velocity and acceleration of an alternator comprising the steps of:

a. generating a first signal proportional to the a-c power flow from the armature of the alternator;

b. generating a second signal proportional to changes in said first signal;

c. generating an excitation signal responsive to said second signal for exciting the field of said alternator;

d. generating a third signal responsive to the angular velocity of the rotor of said alternator;

e. combining said second signal and said third signal to produce a fourth signal;

f. generating a fifth signal proportional to changes in said fourth signal;

g. generating a sixth signal by approximate integration of said fifth signal;

h. generating a seventh signal responsive to the current in said field of said alternator; and i. wherein said excitation signal is also responsive both to said sixth signal and to said seventh signal.

43. The method of claim 40 including the steps of generating a fourth signal responsive to only one polarity of said second signal, and wherein said excitation signal is also responsive to said fourth signal.

44. The method of claim 40 including the steps of generating a fourth signal responsive to only one polarity of said third signal, and wherein said excitation signal is also responsive to said fourth signal.

45. Electrical apparatus comprising an alternator having a shaft and an armature winding, a watt transducer having a current input, a voltage input and a power output, means for generating an armature current proportional to the current flow in the alternator armature winding and means for applying said armature current to said current input, means for generating an armature voltage proportional to the voltage across the armature winding of the alternator and means for applying said armature voltage to said voltage input, means responsive to said armature current for generating a copper loss signal representative of the resistance drop and leakage reactance drop in the alternator and means for applying said copper loss signal to said voltage input, means responsive to said armature voltage and said copper loss signal for generating a core loss signal representative of the alternator core loss and means for applying said core loss signal to said current input, and means responsive to said output of said watt transducer for generating an accelerating power change signal.

46. A method for measuring the acceleration of the rotor of an alternator comprising the steps of:

a. generating a first signal proportional to the a-c power flow out of the alternator;
b. generating a second signal proportional to a power loss component within the said alternator;
c. combining said first and second signal to produce a third signal; and
d. deriving from said third signal by high pass filter means a fourth signal proportional to changes in net accelerating power.

47. A method for measuring the velocity of the rotor of an alternator comprising the steps of:
a. generating a first signal proportional to the a-c power flow out of the alternator;
b. generating a second signal proportional to a power flow component;
c. combining said first and second signal to produce a third signal;
d. deriving from said third signal by high pass filter means a fourth signal proportional to changes in net accelerating power; and
e. deriving from said fourth signal by low pass filter means an output speed signal proportional to changes in the velocity of the said rotor of said alternator.

* * * * *